United States Patent
Buehrer et al.

(10) Patent No.: US 7,400,614 B2
(45) Date of Patent: Jul. 15, 2008

(54) METHODS AND APPARATUS FOR DOWNLINK DIVERSITY IN CDMA USING WALSH CODES

(75) Inventors: R. Michael Buehrer, Morristown, NJ (US); Robert Atmaram Soni, Morris Plains, NJ (US); Jiann-An Tsai, Boonton, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 247 days.

(21) Appl. No.: 10/282,455

(22) Filed: Oct. 29, 2002

(65) Prior Publication Data

US 2003/0081656 A1      May 1, 2003

Related U.S. Application Data

(63) Continuation of application No. 09/294,661, filed on Apr. 19, 1999, now Pat. No. 6,515,978.

(51) Int. Cl.
*H04B 7/216* (2006.01)
*H04J 11/00* (2006.01)
*H04J 13/00* (2006.01)
*H04B 1/02* (2006.01)
*H04B 1/66* (2006.01)

(52) U.S. Cl. .................. 370/342; 370/208; 370/209; 370/335; 370/479; 455/101; 455/102; 455/103

(58) Field of Classification Search ......... 455/101–104; 370/208–209, 342, 320, 334, 335, 441, 479
See application file for complete search history.

(56) References Cited

U.S. PATENT DOCUMENTS

| | | | | |
|---|---|---|---|---|
| 5,652,764 A | * | 7/1997 | Kanzaki et al. | 455/101 |
| 6,141,542 A | * | 10/2000 | Kotzin et al. | 455/101 |
| 6,252,864 B1 | * | 6/2001 | Hayashi | 370/335 |
| 6,317,413 B1 | * | 11/2001 | Honkasalo | 370/209 |
| 6,445,714 B1 | * | 9/2002 | d'Anjou et al. | 370/441 |
| 6,643,338 B1 | * | 11/2003 | Dabak et al. | 375/347 |

FOREIGN PATENT DOCUMENTS

| | | |
|---|---|---|
| JP | 08316851 A | 11/1996 |
| WO | WO 99/12274 | 3/1999 |

OTHER PUBLICATIONS

T.L. Marzetta et al., "Multiple-Antenna Communications When Nobody Knows the Rayleigh Fading Coefficients," Proceedings of the Thirty-Fifth Annual Allerton Conference on Communication, Control and Computing, pp. 1033-1042, Sep. 29-30 and Oct. 1, 1997.

(Continued)

*Primary Examiner*—George Eng
*Assistant Examiner*—Un Cho

(57) ABSTRACT

Downlink diversity in a CDMA system is provided by employing Walsh codes in conjunction with M transmit antennas at a common base station serving K mobiles, where M may or may not be to equal to K. The present invention provides methods and apparatus for improving downlink diversity in a CDMA system. Each transmit antenna transmits a signal representing the result of the modulation of Walsh codes by data signals for each of the K mobiles, assuming there is data pertaining to a particular mobile. The assignment of Walsh codes is accomplished in accordance with a transmission matrix T. The transmission matrix maps the user data symbols onto the Walsh codes for each antenna and is preferably designed such that its columns are representative of the transmit antennas and orthogonal. Thus, at a given mobile, the mobile need only correlate with M different Walsh codes since each transmit signal received contains a component that is the result of M different Walsh codes having been modulated by a data signal associated with that particular mobile. The set of Walsh codes to select from includes $2^{\lceil \log_2(K) \rceil}$ Walsh codes. However, with respect to any given mobile, there is needed only as many different Walsh codes as there are transmit antennas serving the particular mobile. The results of the respective M correlations are combined and, with obtained channel estimates, the receiver estimates the particular data pertaining to that particular mobile so that it can be provided to the user. Also, the present invention provides for various ways to estimate the respective channels between the M transmit antennas and a mobile. It is to be appreciated that the downlink diversity techniques of the invention may be applied to the physical layer proposed in the IS95-C physical layer draft proposal.

8 Claims, 20 Drawing Sheets

OTHER PUBLICATIONS

Siavash M. Alamouti, "A Simple Transmit Diversity Technique for Wireless Communications," IEEE Journal On Select Areas In Communications, vol. 16, No. 8, pp. 1451-1458, Oct. 1998.

Vahid Tarokh et al., "Space-Time Codes for High Data Rate Wireless Communication: Performance Criterion and Code Construction," IEEE Transactions On Information Theory, vol. 44, No. 2, pp. 744-765, Mar. 1998.

* cited by examiner

| ANTENNA | FREQUENCY BAND | $w'_1$ | $\overline{w}'_1$ |
|---|---|---|---|
| 1 | $f_1$ | $s_1^e$ | $s_2^e$ |
| 1 | $f_2$ | $s_2^o$ | $s_3^e$ |
| 1 | $f_3$ | $s_3^o$ | $s_1^o$ |
| 2 | $f_1$ | $(-s_2^e)^*$ | $(s_1^e)^*$ |
| 2 | $f_2$ | $(-s_3^e)^*$ | $(s_2^o)^*$ |
| 2 | $f_3$ | $(s_1^o)^*$ | $(-s_3^o)^*$ |

P/O ANTENNA 2

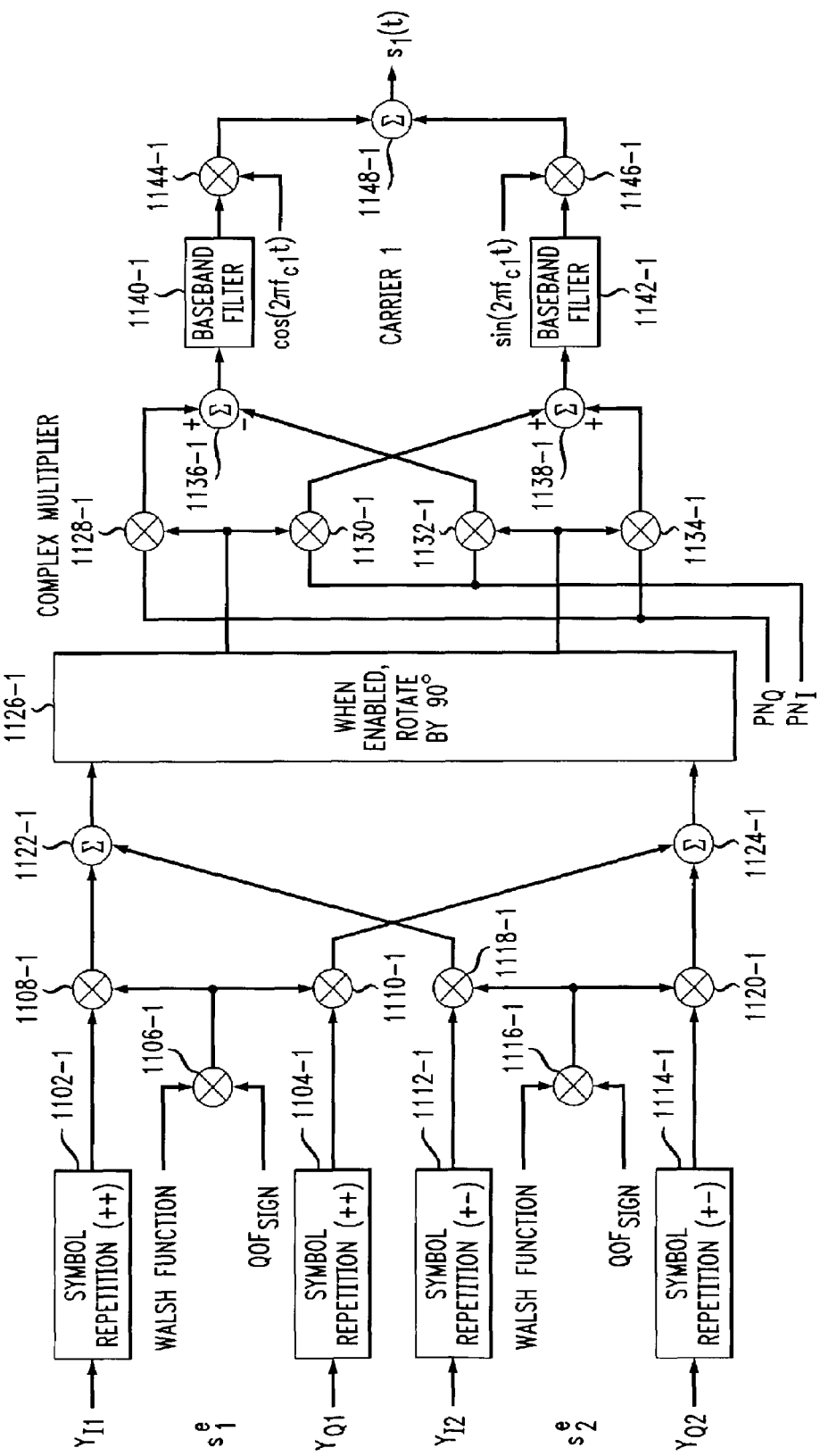

P/O ANTENNA 1

P/O ANTENNA 1

P/O ANTENNA 2

P/O ANTENNA 2

P/O ANTENNA 2

METHODS AND APPARATUS FOR DOWNLINK DIVERSITY IN CDMA USING WALSH CODES

CROSS REFERENCE TO RELATED APPLICATIONS

This application is a continuation of the U.S. application identified by Ser. No. 09/294,661, filed Apr. 19, 1999 now U.S. Pat. No. 6,515,978, the disclosure of which is incorporated by reference herein.

FIELD OF THE INVENTION

The invention relates to Code Division Multiple Access communication systems and, more particularly, to methods and apparatus for providing downlink diversity in such systems employing Walsh codes.

BACKGROUND OF THE INVENTION

Consider a Code Division Multiple Access (CDMA) system that uses orthogonal Walsh functions to separate users on the downlink along with a base station specific covering code. It is well known that "downlink" refers to the communication path or paths from a base station to a mobile terminal or station (hereinafter referred to as a "mobile"), as compared to the "uplink" which is the communication path or paths from a mobile to a base station. For a system with K mobiles receiving signals from a common base station, the transmitted signal on a single antenna may be represented as:

$$x(t) = \left( \sum_{i=1}^{K} \sqrt{P_i} \, s_i(t) w_i(t) + \sqrt{P_p} \, w_0(t) \right) p(t) \quad (1)$$

where $P_i$ is the power transmitted to the $i^{th}$ mobile, $s_i(t)$ and $w_i(t)$ are the data signal and unique Walsh function intended for the $i^{th}$ mobile, respectively, $P_p$ is the power of the pilot signal which uses Walsh function 0, and $p(t)$ is the covering code for the base station of interest. Further, the Walsh functions are orthogonal and repeat every symbol time $T_s$, i.e.:

$$\int_0^{T_s} w_i(t) w_j(t) dt = \begin{cases} 1 & i = j \\ 0 & i \neq j \end{cases} \quad (2)$$

At the mobile, the following signal is received on a single antenna:

$$y(t) = h(t)x(t) + n(t) \quad (3)$$

where h(t) is the complex multiplicative distortion caused by the wireless channel and n(t) is thermal noise. Mobile i correlates the received signal with the $i^{th}$ Walsh function during the $k^{th}$ symbol interval after uncovering to achieve the decision statistic $z_i[k]$:

$$z_i[k] = \int_{(k-1)T_s}^{kT_s} y(t) p^*(t) w_i(t) dt$$
$$= \sqrt{P_i} \, h[k] s_i[k] + n[k] \quad (4)$$

where h[k] represents the cumulative effect of the channel h(t) over the $k^{th}$ symbol interval, and $s_i[k]$ is the $k^{th}$ transmitted symbol for the $i^{th}$ mobile.

The transmitted symbol can be recovered by using an estimate of the channel, ĥ[k], obtainable from the pilot channel, i.e.:

$$\hat{s}_i[k] = f(z_i[k]\hat{h}^*[k]) \quad (5)$$

where f(•) is an appropriate decision function. Assuming a flat, Rayleigh faded channel, in the absence of fast, accurate power control, the resulting performance of the link will be rather poor due to the lack of diversity. As a result, it is desirable to have a second antenna at the receiver to allow diversity reception, improving performance considerably. However, mobile handsets do not easily allow a second antenna to be added. Thus, methods of achieving diversity performance from the transmitter have been proposed.

One method of achieving diversity performance is to transmit the same signals on multiple carriers. However, this is wasteful of the one resource that cannot afford to be wasted in mobile communications, namely, bandwidth. A second more reasonable alternative is delay diversity. This method purposely causes multipath by transmitting the signal twice from the base station with the second transmission delayed in time by several chips and occurring on a separate antenna. By dividing power over two transmissions transmit power is not increased, but time diversity is provided which can easily be exploited by the mobile's Rake receiver with no required changes. However, the scheme is ultimately limited by the self-interference caused by this intentional multipath. Since all user signals are transmitted synchronously, this multipath interference can be quite large, especially for a moderate to heavily loaded system.

Other techniques have been proposed for attempting to improve diversity in the area of space-time coding. For example, a simple two-branch transmission diversity technique is described in Siavash M. Alamouti, "A Simple Transmit Diversity Technique for Wireless Communications," IEEE Journal On Select Areas In Communications, Vol. 16, No. 8, Oct. 1998, the disclosure of which is incorporated herein by reference. Further, the use of channel codes for improving the data rate and the reliability of communications over fading channels using multiple transmit antennas is described in Vahid Tarokh et al., "Space-Time Codes for High Data Rate Wireless Communication: Performance Criterion and Code Construction," IEEE Transactions On Information Theory, Vol. 44, No. 2, Mar. 1998, the disclosure of which is incorporated herein by reference. Still further, a technique for coding messages for transmission on the downlink so as to use multiple transmitting antennas for improved reception in fading environments is described in U.S. provisional application Serial No. 60/114,621, filed on Jan. 4, 1999, entitled: "Space-Time Spreading Method of CDMA Wireless Communication," which is the basis for a U.S. non-provisional application filed on Apr. 2, 1999 having the same title.

SUMMARY OF THE INVENTION

The present invention provides methods and apparatus for improving downlink diversity in a CDMA system. This is advantageously achieved by employing Walsh codes (also known as Walsh functions) in conjunction with M transmit antennas at a common base station serving K mobiles, where M may or may not be equal to K. It is to be appreciated that such form of downlink diversity is referred to herein as Walsh diversity or space-time code diversity.

In any case, each transmit antenna transmits a signal representing the result of the modulation of Walsh codes by data signals for each of the K mobiles, assuming there is data pertaining to a particular mobile. For example, a first transmit antenna may transmit a signal that may include: a component that is the result of a first Walsh code modulated by a data signal associated with a first mobile; a component that is the result of a second Walsh code modulated by a data signal associated with a second mobile; up to and including a component that is the result of a $K^{th}$ Walsh code modulated by a data signal associated with a $K^{th}$ mobile. Then, a second transmit antenna may transmit a signal that may include: a component that is the result of the $K^{th}$ Walsh code modulated by a data signal associated with a first mobile; a component that is the result of the $(K-1)^{th}$ Walsh code modulated by a data signal associated with a second mobile; up to and including a component that is the result of the first Walsh code modulated by a data signal associated with a $K^{th}$ mobile. As is evident, in this example, the same number of Walsh codes are used in conjunction with the second antenna as are used at the first antenna, but simply redistributed with respect to the data signals that respectively modulate them. The ordinals assignment of users may be arbitrary, that is, any user can be specified as user K. However, the relative assignment of Walsh codes is accomplished in accordance with a transmission matrix T. The transmission matrix maps the user data symbols onto the Walsh codes for each antenna and is preferably designed such that its columns are representative of the transmit antennas and are orthogonal. The rows of the matrix are representative of orthogonal channels such as the Walsh codes and frequency bands. Similar redistribution occurs for each of the M transmit antennas such that the respective component in each of the M transmit signals associated with a given mobile's data signal modulates a unique Walsh code. Thus, at a given mobile, the mobile need only correlate with M different Walsh codes since each transmit signal received will contain a component that is the result of M different Walsh codes having been modulated by a data signal associated with that particular mobile. However, it should be noted that in specific embodiments, less than M different Walsh codes may be used. It is also to be appreciated that the M antennas at the base station are preferably independent or uncorrelated with respect to one another.

As will be explained below, the set of Walsh codes to select from includes $2^{\lceil \log_2(K) \rceil}$ Walsh codes. However, with respect to any given mobile, there is needed only as many different Walsh codes as there are transmit antennas serving the particular mobile. The results of the respective M correlations are combined and, with obtained channel estimates, the receiver estimates the particular data pertaining to that particular mobile so that it can be provided to the user. It is to be appreciated that K can be less than the total number of mobiles with which the base station is capable of establishing communications. Also, the present invention provides for various ways to estimate the respective channels between the M transmit antennas and a mobile. Accordingly, the present invention provides improved downlink diversity using Walsh codes in such a manner that: (i) does not require additional receive antennas at a mobile; (ii) does not waste bandwidth; and (iii) does not cause self-interference.

It is to be appreciated that the downlink diversity techniques of the invention may be applied to the physical layer proposed in the IS-95C physical layer draft proposal. This form of diversity advantageously extends the orthogonal transmit diversity (OTD) option of the draft proposal, which obtains only minimal coding gain, and provides true diversity gain. The present invention provides various IS-95C direct-spread and multi-carrier embodiments. However, it is to be understood that the techniques of the invention are more widely applicable to any CDMA communication systems or the like.

BRIEF DESCRIPTION OF THE DRAWINGS

FIGS. 11A, 11B and 11C are block diagrams illustrating portions of a CDMA transmitter according to a first exemplary IS-95C multi-carrier embodiment of the invention;

DETAILED DESCRIPTION OF PREFERRED EMBODIMENTS

Figure 1:
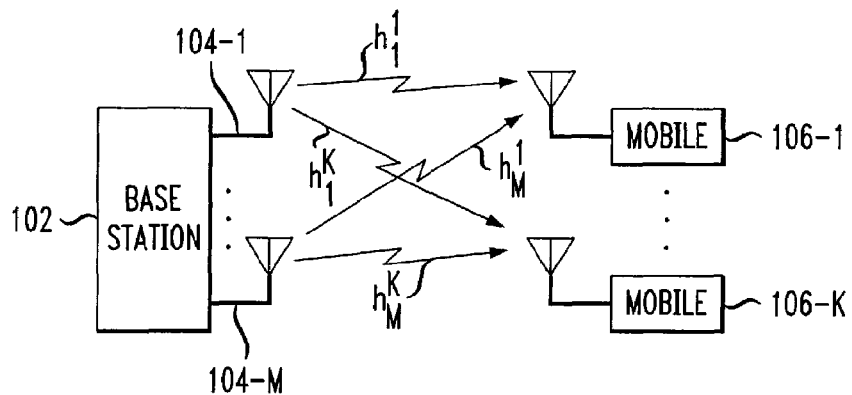
FIG. 1 is a block diagram illustrating a CDMA system for implementing downlink diversity according to the invention.

As will be explained in detail, the present invention provides methods and apparatus for achieving improved diversity on the downlink path between a base station and mobiles in a CDMA system. This is achieved by employing multiple transmit antennas at a common base station and a set of $2^{\lceil \log_2(K) \rceil}$ Walsh codes in accordance with a transmission matrix T, as will be explained, where there are K mobiles associated with the base station. In this manner, downlink diversity is advantageously achieved without requiring an additional receive antenna at any mobile, without wasting bandwidth, and without causing self-interference.

Consider the system described above with respect to equations (1) through (5), but now let us consider two transmit antennas and, for the sake of simplicity, two users. For the moment, we shall ignore the pilot. On the first antenna we transmit:

$$x_1(t) = \left( \sqrt{\frac{P_1}{2}} s_1(t) w_1(t) - \sqrt{\frac{P_2}{2}} s_2^*(t) w_2(t) \right) p(t) \tag{6}$$

and on the second antenna we transmit:

$$x_2(t) = \left( \sqrt{\frac{P_1}{2}} s_1^*(t) w_2(t) + \sqrt{\frac{P_2}{2}} s_2(t) w_1(t) \right) p(t) \tag{7}$$

It is to be appreciated that $s_1(t)$ represents a data signal associated with the first user and $s_2(t)$ represents a data signal associated with the second user. Further, $s_1(t)^*$ represents the complex conjugate of the data signal associated with the first user and $s_2(t)^*$ represents the complex conjugate of the data signal associated with the second user. It is to be understood that the use of the asterisk (*) in connection with a variable or function is intended to denote the complex conjugate of that variable or function.

At the receiver, we uncover and correlate with the two Walsh codes. At the output of the two Walsh correlations we obtain (dropping the dependence on symbol interval):

$$z_1 = \sqrt{\frac{P_1}{2}} h_1 s_1 + \sqrt{\frac{P_2}{2}} h_2 s_2 + n_1 \tag{8}$$

$$z_2 = \sqrt{\frac{P_1}{2}} h_2 s_1^* - \sqrt{\frac{P_2}{2}} h_1 s_2^* + n_2 \tag{9}$$

which introduces interference terms in the decision statistics. However, assuming we have estimates of the channel distortions $\hat{h}_1$ and $\hat{h}_2$, we can obtain a signal estimate for the first mobile as follows:

$$\hat{s}_1 = f\{\hat{h}_1^* z_1 + \hat{h}_2 z_2^*\} \tag{10}$$

$$= f\left\{\hat{h}_1^*\left(\sqrt{\frac{P_1}{2}} h_1^* s_1 + \sqrt{\frac{P_2}{2}} h_2 s_2 + n_1\right) + \hat{h}_2\left(\sqrt{\frac{P_1}{2}} h_2 s_1^* - \sqrt{\frac{P_2}{2}} h_1 s_2^* + n_2\right)^*\right\}$$

$$= f\left\{\left(\sqrt{\frac{P_1}{2}} |h_1|^2 + \sqrt{\frac{P_1}{2}} |h_2|^2\right) s_1 + h_1^* n_1 + h_2 n_2^*\right\}$$

where we have assumed that the channel estimation is exact, that is, $\hat{h}_1 = h_1$ and $\hat{h}_2 = h_2$. Similarly, we can estimate the data for the second mobile as follows:

$$\hat{s}_2 = f\{\hat{h}_2^* z_1 - \hat{h}_1 z_2^*\} \tag{11}$$

$$= f\left\{\left(\sqrt{\frac{P_2}{2}} |h_1|^2 + \sqrt{\frac{P_2}{2}} |h_2|^2\right) s_2 + h_2^* n_1 - h_1 n_2^*\right\}$$

It is to be appreciated that this is identical to the decision statistic for two-antenna diversity reception (without the 3 dB aperture gain). Accordingly, we advantageously achieve diversity gain without employing additional antennas at the receiver, without requiring additional bandwidth, and without causing self-interference. It is to be appreciated that "diversity gain" refers to improved reception due to improvement in the statistical distribution of the signal-to-noise ratio at the mobile.

The techniques of the present invention can also be extended to an arbitrary number of antennas. Some important aspects of the techniques of the invention may be represented in the context of a transmission matrix T. If we let rows represent the Walsh codes and the columns represent the transmit antennas at a base station, the two-antenna, two-user technique can be represented by:

$$T = \begin{bmatrix} s_1 & -s_2^* \\ s_2 & s_1^* \end{bmatrix} \tag{12}$$

In order to obtain the desired signals at the receiver without interference, the columns of T need to be orthogonal. For example, in the above formulation:

$$t_2^t t_1 = -s_2 s_1 + s_1 s_2 \tag{13}$$
$$= 0$$

where $t_i$ is the $i^{th}$ column of T and $(\ )^t$ represents the transpose conjugate.

To increase the number of users, we simply increase the matrix wherein the columns are orthogonal. One other requirement is that the matrix have $2^n$ rows for some integer n. In other words, for K users we would require $2^{\lceil \log_2(K) \rceil}$ codes where $\lceil \cdot \rceil$ is the ceiling operator. That is, $n = \lceil \log_2(K) \rceil$. The number of antennas M however is arbitrary provided that $M \leq n$. It is likely that $M < K$, for example, $M = 2$ or 4. As a further example, if we assume BPSK (binary phase shift keying) modulation with four users and two antennas, we can use the transmission matrix:

$$T = \begin{bmatrix} s_1 & -s_4 \\ s_2 & -s_3 \\ s_3 & s_2 \\ s_4 & s_1 \end{bmatrix} \tag{14}$$

This transmission matrix is also key to decoding the received signal. We can represent the vector of Walsh outputs z as:

$$z = Th + n \tag{15}$$

where h is the vector of channel coefficients. As mentioned, we design the transmission matrix so that it is orthogonal, i.e., $T^t T = nI$, where n is the number of Walsh codes. However, we can rewrite z as:

$$z = Hs + n \tag{16}$$

where H is a channel matrix which maps the transmitted symbols to the Walsh codes they use weighted by the appropriate channel coefficient. In other words, $Th = Hs$. It can be shown that since T is designed to be orthogonal, H is also orthogonal. Thus, to decode, we simply create an estimate of H through knowledge of T and an estimate of h. Thus, decoding at the receiver follows as:

$$\hat{s} = H^t z \quad (17)$$
$$= \alpha s + H^t n$$

where $\alpha = |h_0|^2 + |h_1|^2 + K|h_M|^2$ thus providing M-fold diversity if all channels are independent.

Walsh diversity as described herein relies on estimates of the channel coefficients to obtain diversity performance and remove interference terms due to other users. The following is an explanation of preferred methods of performing the channel estimation process in a CDMA system employing Walsh diversity.

In one embodiment, the channel estimation process for acquiring the required channel coefficients is to assign a single Walsh code as a pilot channel on each antenna. That Walsh code would be used only for that antenna and we would thus need to use M Walsh codes for channel estimation where M is the number of transmit antennas.

As an example, consider a system with two transmit antennas labeled antenna 0 and antenna 1 and two users (mobiles). We reserve Walsh code 0 for the pilot associated with antenna 0 and Walsh code 1 for the pilot associated with antenna 1. Thus, at the receiver, we obtain after RF filtering, down-conversion, and uncovering (i.e., removing the covering code):

$$r(t) = \sqrt{P_p}\, w_0(t) h_0 + \sqrt{P_p}\, w_1(t) h_1 + \sqrt{\frac{P_1}{2}}\, s_1 w_2(t) h_0 + \quad (18)$$
$$\sqrt{\frac{P_1}{2}}\, s_1^* w_3(t) h_1 + \sqrt{\frac{P_2}{2}}\, s_2 w_2(t) h_1 - \sqrt{\frac{P_2}{2}}\, s_2^* w_3(t) h_0 + n(t)$$

where $P_p$ is the power associated with either pilot, $P_i$ and $s_i$ are the power and data signal associated with mobile i, and $h_i$ is the channel seen at the mobile from antenna i. Now, at the output of the Walsh correlator in the receiver for mobiles 1 and 2 (using Walsh codes 2 and 3), we have:

$$z_2 = \sqrt{\frac{P_1}{2}}\, h_0 s_1 + \sqrt{\frac{P_2}{2}}\, h_1 s_2 + n_1 \quad (19)$$

$$z_3 = \sqrt{\frac{P_1}{2}}\, h_1 s_1^* - \sqrt{\frac{P_2}{2}}\, h_0 s_2^* + n_2 \quad (20)$$

To obtain estimates of $s_1$ and $s_2$ we first need estimates of $h_0$ and $h_1$. This is accomplished in a straightforward manner by simply correlating with Walsh codes 0 and 1. Thus, we estimate $h_0$ as:

$$\hat{h}_0 = \int_0^T r(t) w_0(t) dt \quad (21)$$
$$= \sqrt{P_p}\, h_0 + n_0.$$

Similarly, we estimate $h_1$ as:

$$\hat{h}_1 = \int_0^T r(t) w_1(t) dt \quad (22)$$
$$= \sqrt{P_p}\, h_1 + n_1$$

It is clear that for M transmit antennas, we simply reserve M Walsh codes, one for each of the M pilot channels.

In a system that does not employ pilot channels, but rather uses pilot symbols, we can also acquire channel estimates in a straightforward manner. We simply transmit N known data symbols synchronously on each of the $2^{\lceil log_2(K) \rceil}$ Walsh codes. This is illustrated by the following example. Consider a system with two transmit antennas and four users. The received signal after down-conversion is:

$$r(t) = \sqrt{\frac{P_1}{2}}\, s_1 w_1(t) h_0 + \sqrt{\frac{P_2}{2}}\, s_2 w_2(t) h_0 + \quad (23)$$
$$\sqrt{\frac{P_3}{2}}\, s_3 w_3(t) h_0 + \sqrt{\frac{P_4}{2}}\, s_4 w_4(t) h_0 K - \sqrt{\frac{P_4}{2}}\, s_4 w_1(t) h_1 -$$
$$\sqrt{\frac{P_3}{2}}\, s_3 w_2(t) h_1 + \sqrt{\frac{P_2}{2}}\, s_2 w_3(t) h_1 + \sqrt{\frac{P_1}{2}}\, s_1 w_4(t) h_1 + n(t)$$

where we have assumed real symbols. At the output of the four Walsh correlators in the receiver, we have:

$$z_1 = s_1 h_0 - s_4 h_1 + n_1$$
$$z_2 = s_2 h_0 - s_3 h_1 + n_2$$
$$z_3 = s_3 h_0 + s_2 h_1 + n_3$$
$$z_4 = s_4 h_0 + s_1 h_1 + n_4$$

where $n_i$ is the AWGN (additive white gaussian noise) component of correlator output i. If all the training symbols are 1, i.e., $s_i = 1$, then we simply have:

$$\hat{h}_0 = \frac{z_1 + z_2 + z_3 + z_4}{4} \quad (25)$$
$$= \alpha h_0 + \frac{\beta}{4}(n_1 + n_2 + n_3 + n_4)$$

where $\alpha = \sqrt{\frac{P_1}{2}} + \sqrt{\frac{P_2}{2}} + \sqrt{\frac{P_3}{2}} + \sqrt{\frac{P_4}{2}}$, and $\beta = \sqrt{\frac{P_1}{2}} + \sqrt{\frac{P_2}{2}} - \sqrt{\frac{P_3}{2}} - \sqrt{\frac{P_4}{2}}$, and $$\hat{h}_1 = \frac{-z_1 - z_2 + z_3 + z_4}{4} \quad (26)$$
$$= \alpha h_1 - \frac{\beta}{4}(-n_1 - n_2 + n_3 + n_4)$$

If all of the training symbols are not equal to unity but are known, we can still obtain channel coefficients. In general, the outputs of the Walsh correlators z can be expressed as:

$$z = Hs + n \quad (27)$$

where H is the channel matrix which describes the mapping of transmit symbols to Walsh correlators and n is a vector of noise samples. As explained above, the system of the invention is designed such that $H^t H=\alpha I$ where $()^t$ represents the conjugate transpose and $\alpha=|h_0|^2+|h_1|^2+K|h_M|^2$. Thus, decoding is accomplished by premultiplying the vector z by the conjugate transpose of the channel matrix which must be estimated. However, it can be shown that equation (27) can be expressed as:

$$z = Hs + n \quad (28)$$
$$= Th + n$$

where T is the transmission matrix and h is the channel vector. Now, it can be shown that T is also orthogonal, i.e., $T^tT=mI$, where m is the number of Walsh codes. Thus, to obtain channel coefficients we simply transmit a training sequence for all users simultaneously so that T is known. Thus, at each training symbol interval we can estimate the channel as:

$$\hat{h} = \frac{1}{m}T^tz \quad (29)$$
$$= h + \frac{1}{m}T^tn$$

The number and frequency of the training symbols are determined by the SNR (signal-to-noise ratio) required in the channel estimate and the rate of the channel. The training symbols must be inserted often enough to track the changing channel but as seldom as possible so that data capacity is not wasted. Also, by increasing the length N of the training sequence the SNR of the channel estimate is improved since we can average out the effect of noise on each individual sample, but again data capacity is wasted. The size and frequency of the training sequence is thus a design parameter.

Figure 2:
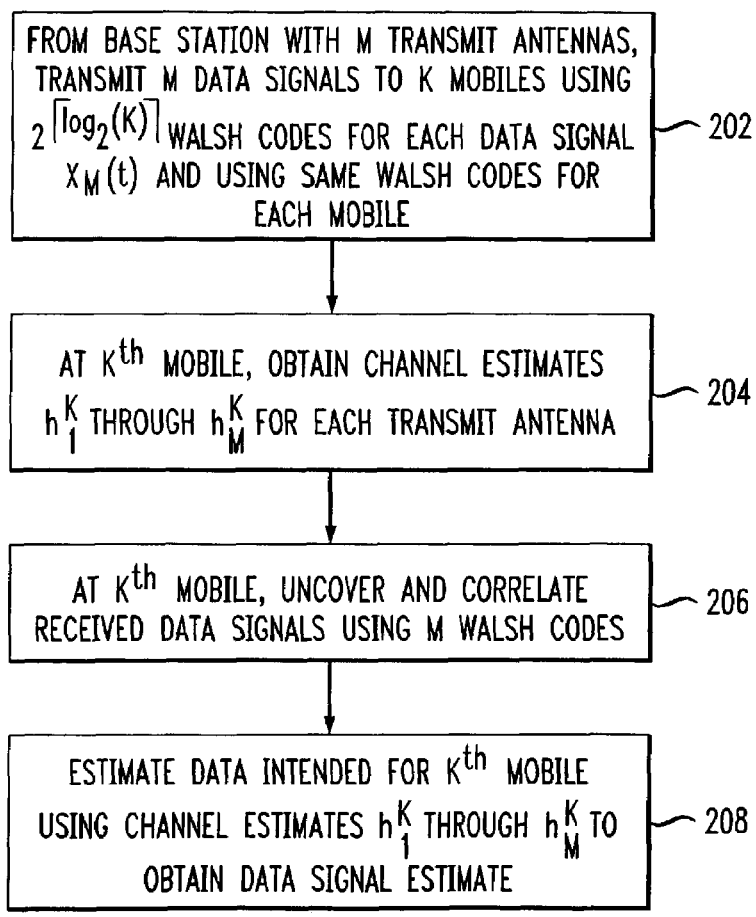
FIG. 2 is a flow chart illustrating a method for providing downlink diversity according to the invention.

Referring now to FIGS. 1 and 2, a generalized block diagram illustrating a CDMA system 100 and a flow chart for implementing a downlink diversity method 200 according to the invention are shown. A base station 102 in the CDMA system 100 is equipped with M transmit antennas 104-1 through 104-M. According to the invention, the M transmit antennas respectively transmit M data signals to K mobiles 106-1 through 106-K (step 202 of FIG. 2). It is to be appreciated that, similar to equations (6) and (7) above, each of the M data signals contain a data signal portion that pertains to each of the K mobiles. Given K mobiles, each transmit signal requires $2^{\lceil log_2(K) \rceil}$ Walsh codes, in accordance with the invention. The relative assignment of Walsh codes is accomplished in accordance with a transmission matrix T. as explained above. However, each mobile needs only M Walsh codes.

Each mobile contains a single antenna which receives the respective data signals transmitted by the M base station antennas. As shown in FIG. 1, each data channel between a base station transmit antenna and a mobile has some unique channel characteristics (e.g., signal distortion, etc.) associated therewith. As explained above, proper estimation of the channels is important to the estimation of the data signal at the receiver. Thus, the estimate of the channel formed between the transmit antenna 104-1 and the mobile 106-1 is represented as $h_1^1$, while the estimate of the channel formed between transmit antenna 104-M and mobile 106-1 is represented by $h_M^1$. This notation is extended to the data channels between the M transmit antennas and the mobile 106-K.

Next, the following steps occur at each of the mobiles, however, such steps are generally explained with respect to the $K^{th}$ mobile. In step 204, the mobile obtains channel estimates $h_1^K$ through $h_M^1$, for example, in one of the ways described above. Then, in step 206, the mobile uncovers and correlates the received data signals using the M Walsh codes. This step is equivalent to the computation of equations (8) and (9) above with respect to the two antenna/two user scenario. Lastly, in step 208, the estimate of the data intended for the $K^{th}$ mobile, $s_K(t)$ is found. Again, this corresponds to equation (10) or equation (17) above.

IS-95C Direct-Spread Embodiment

Currently, the physical layer draft proposal for IS-95C supports as an option a form of transmit diversity which is known as orthogonal transmit diversity (OTD). This is described in J. Losh, "TR45 Mobile Station-Base Station Compatibility Standard For Dual-Mode Wideband Spread Spectrum Systems (Physical Layer)," IS95C Draft Proposal (Revision 7), Feb. 16, 1999, the disclosure of which is incorporated herein by reference.

In the optional OTD mode, users are assigned two Walsh codes. The data is split into even and odd streams, and coded independently. The two codes are closely related. If, for example, a user j is assigned a Walsh code, $w_j^N(t)$, of length N in the normal mode, then the user j would be assigned two codes which are formed from $w_j^N(t)$ in the optional OTD mode. These two codes are formed as follows:

$$w_j^{2N}(t) = [w_j^N(t) w_j^N(t)] \quad (30)$$

$$w_{j+N}^{2N}(t) = [w_j^N(t) -w_j^N(t)]$$

where the code length has increased to 2N (reflected in the superscript) and there are now 2N possible codes (reflected in the subscript). Further, the second code, $w_{j+N}^{2N}(t)$, is often referred to as the complementary code of $w_j^{2N}(t)$, that is, $w_{j+N}^{2N}(t) = \overline{w}_j^{-2N}(t)$.

In addition, a separate pilot channel is available for each antenna. Currently, OTD mode only supports two antennas, but it is easily extended to four antennas. The physical layer to support OTD for two antennas is described in the above-referenced IS-95C Physical Layer Draft Proposal (J. Losh at pg. 3-27). The relevant Walsh spreading portions of the physical layer are shown in FIG. 3.

Figure 3:
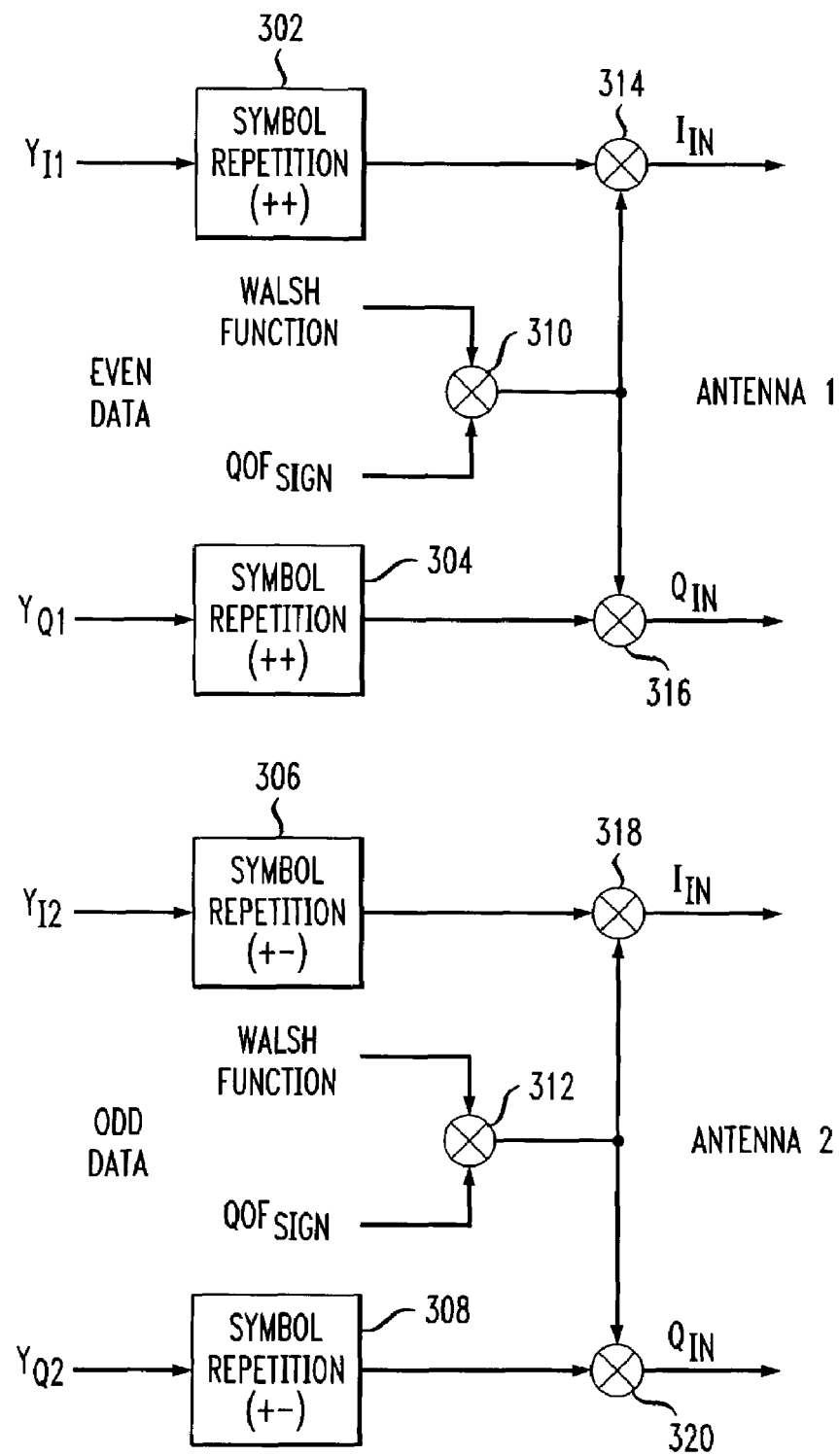
FIG. 3 is a block diagram illustrating a Walsh spreading portion of a IS-95C CDMA transmitter.

As shown in FIG. 3, an input sequence is multiplexed amongst the four inputs $Y_{I1}, Y_{Q1}, Y_{I2}$ and $Y_{Q2}$. Starting with an input sequence s(n), the inputs may be represented as: $Y_{I1}=\{s(0), s(4), s(8) \ldots\}$; $Y_{Q1}=\{s(2), s(6), s(10) \ldots\}$; $Y_{I2}=\{s(1), s(5), s(9) \ldots\}$; and $Y_{Q2}=\{s(3), s(7), s(11) \ldots\}$. These inputs are then held in the symbol repetition units 302 through 308, respectively, for two symbol intervals and multiplied by the signs indicated in the boxes depicting units 302 through 308. In multipliers 310 and 312, a pre-assigned Walsh function is multiplied by a quasi-orthogonal function (QOF, as described in the IS-95C standard). The output of the multiplier 310 is then respectively multiplied with the outputs of the symbol repetition units 302 and 304 in multipliers 314 and 316, while the output of the multiplier 312 is respectively multiplied with the outputs of the symbol repetition units 306 and 308 in multipliers 318 and 320. This is the spreading operation. The in-phase and quadrature portions of the signal are labeled $I_{in}$ and $Q_{in}$, respectively. These outputs are then mixed with the carrier components for the respective antennas, Antenna 1 and Antenna 2, and transmitted.

Using the partitioned data stream framework of the OTD option of the IS-95C proposal, a form of space-time code or Walsh diversity according to the invention may be readily implemented with few changes to the proposal. Since each user is assigned two Walsh codes and the data is partitioned into two streams, the diversity scheme developed here may be applied to the two streams as if they were two different users. On the first antenna, we transmit:

$$x_1(t) = \sqrt{\frac{P}{2}} [s_e(t)w(t) - s_o(t)^* \overline{w}(t)] p(t) \qquad (31)$$

where P represents the total transmit power, $s_o(t)$ is the even symbol stream, and $s_o(t)$ is the odd symbol stream. The Walsh code, w(t) and its complement, $\overline{w}(t)$ are used to spread the signal. On the second antenna, we transmit:

$$x_2(t) = \sqrt{\frac{P}{2}} [s_e^*(t)\overline{w}(t) + s_o(t)w(t)] p(t) \qquad (32)$$

Figure 4:
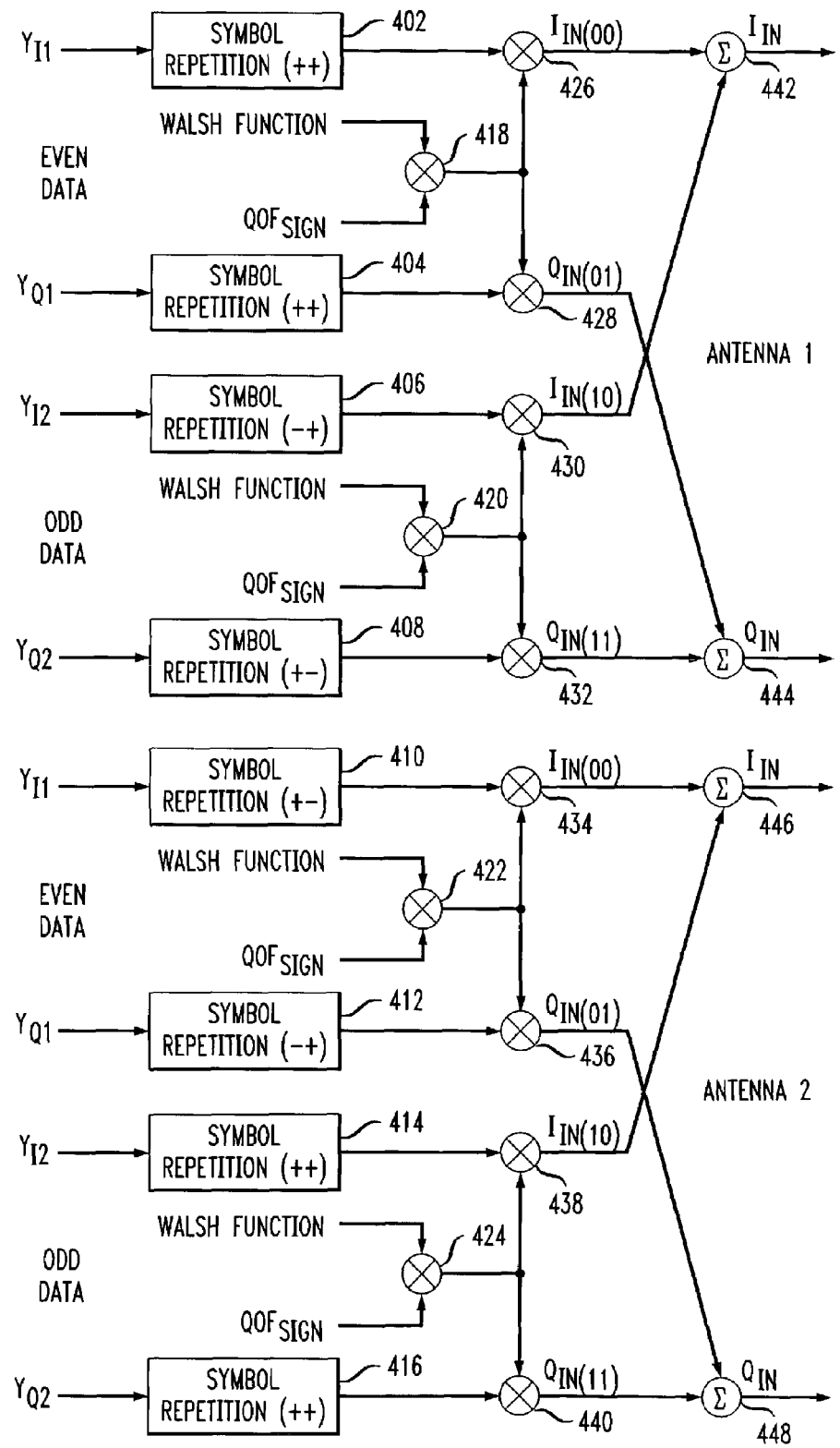
FIG. 4 is a block diagram illustrating a Walsh spreading portion of a CDMA transmitter according to an exemplary embodiment of the invention.

The changes required to FIG. 3 to support Walsh diversity according to the present invention are shown in FIG. 4. As shown, an additional spreader per signal stream (even and odd) are added. Again, for the sake of simplicity, only the relevant Walsh spreading portions of the transmitter are shown. The input sequence s(n) is multiplexed amongst the four inputs $Y_{I1}$, $Y_{Q1}$, $Y_{I2}$ and $Y_{Q2}$ as above: $Y_{I1}$={s(0), s(4), s(8) ... }; $Y_{Q1}$={s(2), s(6), s(10) ... }; $Y_{I2}$={s(1), s(5), s(9) ... }; and $Y_{Q2}$={s(3), s(7), s(11) ... }. The inputs are respectively held in symbol repetition units 402 through 416 for two symbol intervals and multiplied by the indicated signs. As shown, the signs of the symbol repetition units that receive an input are different with respect to Antenna 1 and Antenna 2. For example, input symbol $Y_{I1}$, is multiplied by (++) signs for Antenna 1 but by (+−) signs for Antenna 2. The signs incorporate the conjugation and change of sign operation required for Walsh diversity. Similarly, the signs used to multiply the other symbols of the input sequence are different between the two antennas.

In multipliers 418 through 424, a pre-assigned Walsh function is multiplied by a quasi-orthogonal function (QOF, as described in the IS-95C standard). The output of the multiplier 418 is then respectively multiplied with the outputs of the symbol repetition units 402 and 404 in multipliers 426 and 428, while the output of the multiplier 420 is respectively multiplied with the outputs of the symbol repetition units 406 and 408 in multipliers 430 and 432. Also, the output of the multiplier 422 is respectively multiplied with the outputs of the symbol repetition units 410 and 412 in multipliers 434 and 436, while the output of the multiplier 424 is respectively multiplied with the outputs of the symbol repetition units 414 and 416 in multipliers 438 and 440. Again, this is the spreading operation. The in-phase and quadrature portions of the signal are labeled $I_{in}$ and $Q_{in}$, respectively. The in-phase portion $I_{in(00)}$ associated with Antenna 1 is summed with the in-phase portion $I_{in(10)}$ associated with Antenna 1 in summer 442, while the quadrature portion $Q_{in(01)}$ associated with Antenna 1 is summed with the quadrature portion $Q_{in(11)}$ associated with Antenna 1 in summer 444. The outputs of summers 442 and 444 are then mixed with the carrier components for Antenna 1 and transmitted. Similarly, the in-phase portion $I_{in(00)}$ associated with Antenna 2 is summed with the in-phase portion $I_{in(01)}$ associated with Antenna 2 in summer 446, while the quadrature portion $Q_{in(01)}$ associated with Antenna 2 is summed with the quadrature portion $Q_{in(11)}$ associated with Antenna 2 in summer 448. The outputs of summers 446 and 448 are then mixed with the carrier components for Antenna 2 and transmitted.

Figure 5:
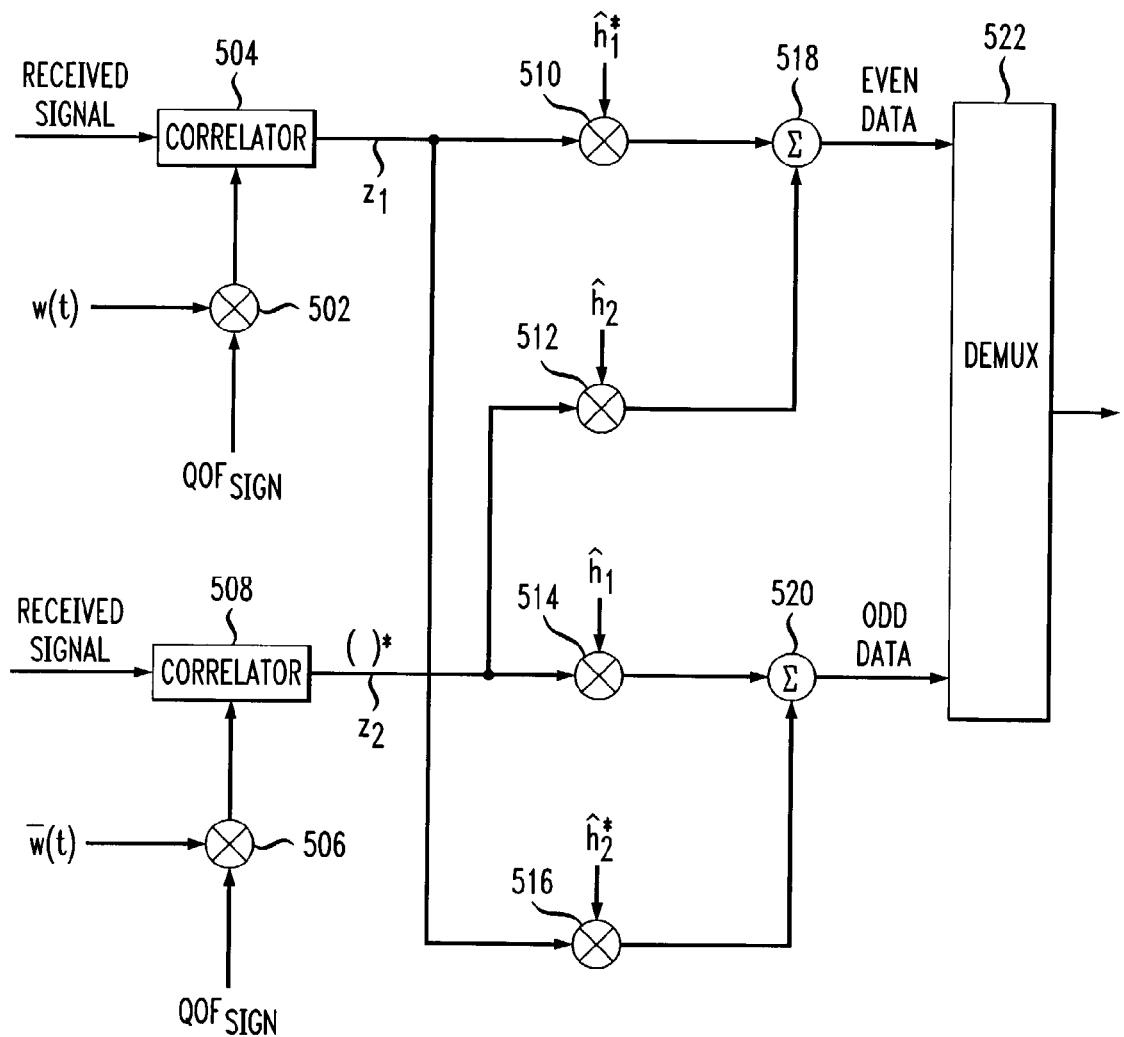
FIG. 5 is a block diagram illustrating a CDMA receiver according to an exemplary embodiment of the invention.

In order to decode this data, the space-time code framework for the receiver may be utilized by translating the multi-user detection problem into an even/odd data stream detection problem. The IS-95C standard imposes no suggestions about how to optimally detect a signal coded in OTD mode. Using the space-time methods of the invention described herein, an MRC-like Rake combiner can be used to decode the signal according to the invention. An example of such a Rake receiver is shown in FIG. 5 where it is to be understood that such figure represents only one finger of the Rake receiver. The other fingers are similar and therefore not shown for the sake of simplicity. As shown, the demodulated received signal is de-spread by the combination of the Walsh function w(t) and QOF. This is accomplished by first multiplying w(t) and QOF in multiplier 502 and then correlating (i.e., multiplying and integrating) the demodulated received signal with the output of multiplier 502 in correlator 504. The output of correlator 504 is denoted as $z_1$. The received data after uncovering is also de-spread by the complement of the Walsh function w(t), denoted as $\overline{w}(t)$ and QOF. This is accomplished by first multiplying $\overline{w}(t)$ and QOF in multiplier 506 and then correlating the demodulated received signal with the output of multiplier 506 in correlator 508. The output of correlator 508 is then subjected to a conjugation operation (denoted as ( )*) to generate $z_2^*$. Next, multipliers 510 and 512 and summer 518 implement the operations computed in equation (10) above, while multipliers 514 and 516 and summer 520 implement the operations computed in equation (11) above. That is, the outputs of the de-spreaders are combined as described in equations (10) and (11) to form estimates of the even and odd streams of data. A demultiplexer 522 then produces a single stream of data from the estimates of the even and odd data for the receiver.

Using such a Rake receiver, we get the following decision statistic for the even stream (where we've assumed perfect knowledge of the channels, $h_1$ and $h_2$):

$$\hat{s}_e(t) = f \left\{ \sqrt{\frac{P}{2}} (|h_1|^2 + |h_2|^2) s_e(t) + h_1^* n_1 + h_2 n_2^* \right\} \qquad (33)$$

and for the odd stream of data, we get the following:

$$\hat{s}_o(t) = f \left\{ \sqrt{\frac{P}{2}} (|h_1|^2 + |h_2|^2) s_o(t) + h_2^* n_1 + h_1 n_2^* \right\} \qquad (34)$$

where for this context, $n_1$ represents the thermal noise at the output of the Walsh correlator using w(t) and $n_2$ is the noise process associated with the correlator for $\overline{w}(t)$.

Some simulations were executed to compare the performance of the space-time codes of the invention with other forms of two branch diversity. These other forms included two antennas broadcasting with a delay form of diversity, the inherent diversity introduced when a user enters handoff, and the theoretically best performance obtained using two independently faded Rayleigh processes combined with two independent noise processes. With both the delay form of diversity and the space-time code form of diversity, we used a channel model which assumed 10λ spacing between antenna elements, and 180 degree angle departure spread.

Figure 6:
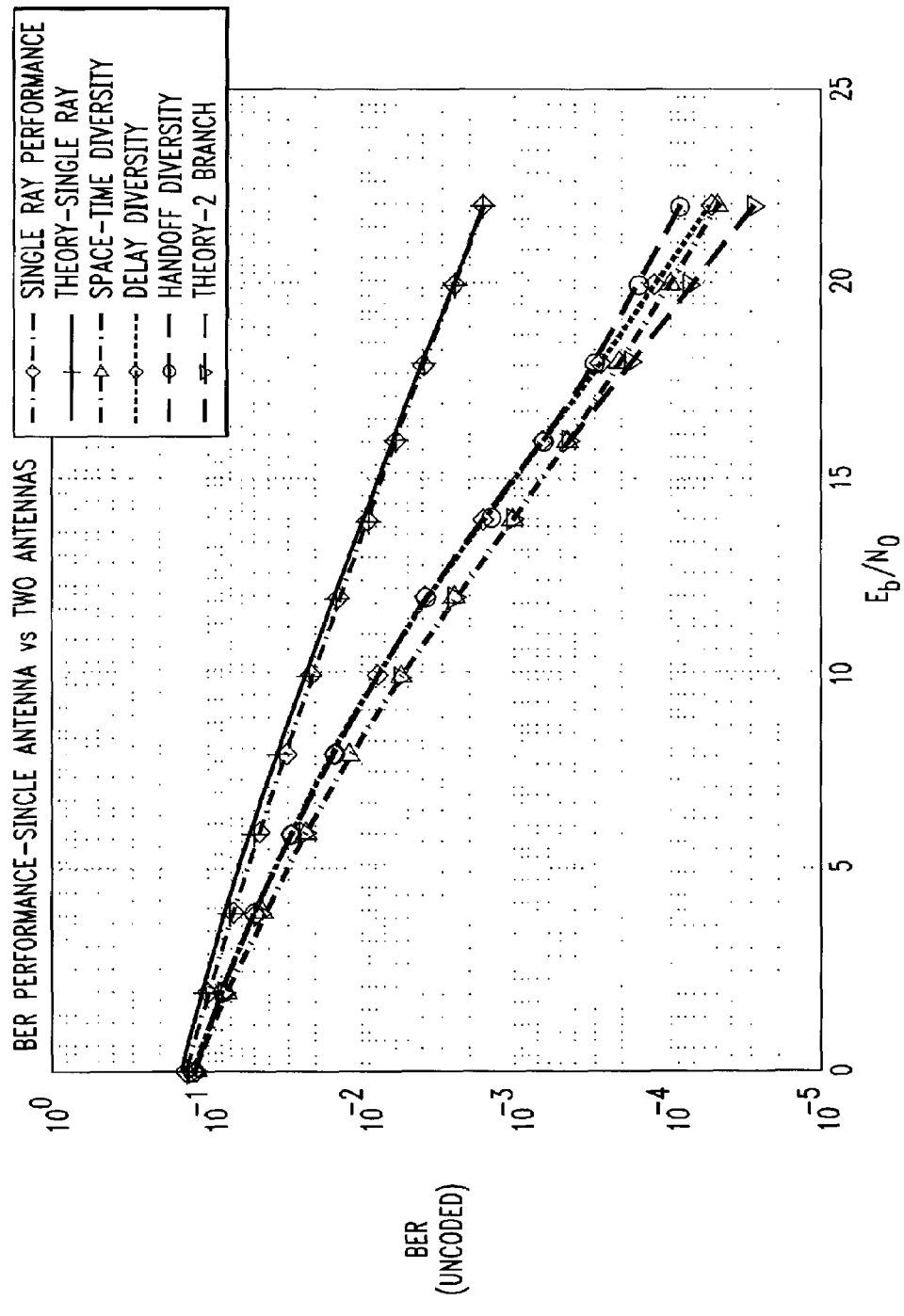
FIG. 6 is a graphical representation illustrating a comparison of BER performance with respect to various forms of diversity including downlink diversity according to the invention.

The BER (bit error rate) performance of a single high data rate user receiving at 153.6 kbps is demonstrated for the diversity cases discussed; the performance of a user with no form of diversity is also displayed for reference in FIG. 6. The channel exhibits flat Rayleigh fading with a Doppler of 60 Hz. A simple linear least squares regression scheme is used to estimate the channel.

The theoretical improvement of the two-branch diversity at a 1% error rate is approximately 5 to 7 dB. The delay diversity and handoff diversity schemes come close to the theoretically optimal improvement in diversity, but differ by approximately 1 dB. The effects of self-interference in the delay diversity and cross-interference in the handoff supported case can lead to the 1 dB separation from the optimal performance for two-branch diversity. However, the space-time code of the invention does not suffer from the effects of self-interference or cross-interference, and achieves close to the optimal performance in the regions of interest for the receiver. This 1 dB difference will be significantly larger for larger loading conditions, since the self-interference associated with delay diversity will increase with loading, while the Walsh diversity scheme of the invention described herein generates no self-interference (for perfect channel estimation).

IS-95C Multi-Carrier Embodiment

Figures 7, 8:
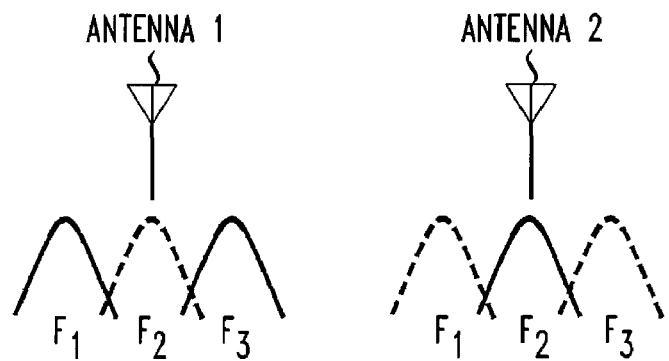
FIG. 7 is a diagram illustrating transmission frequencies in IS-95C multi-carrier implementation.
FIG. 8 is a tabular representation illustrating transmission characteristics for a single user using multi-carrier according to an exemplary embodiment of the invention.

Multi-carrier transmission is an option within the IS-95C standard to provide 3X bandwidth (~5 MHz) while remaining compatible with current 1 X systems, as described in the above-referenced IS-95C Physical Layer Draft Proposal (J. Losh). Essentially, instead of increasing the chip rate by a factor of 3, the data is simply split into 3 streams and modulated onto three separate carriers. Additionally, the three carriers are to be sent on two antennas with the two non-adjacent bands being sent on the first antenna (antenna 1) and the third (middle) band being sent on the second antenna (antenna 2) as shown in FIG. 7. Thus, at the receiver on frequency $f_1$ after demodulation and uncovering we receive:

$$r_1(t) = \sum_{i=0}^{K} \sqrt{P_{i,1}} \, h_{1,1} s_{i,1} w_i + n_1(t) \tag{35}$$

where $P_{1,1}$ is the power associated with data stream 1 of signal $i(s_{1,1})$, $h_{n,m}$ is the channel seen at the receiver from antenna n over frequency band m. Similarly, on frequencies $f_2$ and $f_3$ we receive:

$$r_2(t) = \sum_{i=0}^{K} \sqrt{P_{i,2}} \, h_{2,2} s_{i,2} w_i + n_2(t) \tag{36}$$

and $$r_3(t) = \sum_{i=0}^{K} \sqrt{P_{i,3}} \, h_{1,3} s_{i,2} w_i + n_3(t) \tag{37}$$

Thus, despite using multiple carriers and antennas, no diversity is achieved at the uncoded symbol level. However, since the data is interleaved over all three carriers, diversity gain is achieved in the decoding process, particularly at low speeds where interleaving over one carrier is not sufficient.

Assuming that there is a low correlation (e.g., less than 0.7) between fading envelopes seen at adjacent frequency bands (this assumption is valid in channels with moderate to high delay spread) we have potentially six independent channels over which we can send signals. Since there are three data streams to be sent, at least two-fold diversity reception can be achieved. Additionally, if we are willing to use an additional Walsh code, four-fold diversity can be achieved. To show this, we now assume that signals are sent on all three frequency bands on all three antennas for a given user. All other users are transmitted as before. By assigning signals to the frequency bands and antennas intelligently, we receive the following signal on frequency $f_1$:

$$r_1(t) = \sqrt{\frac{P_{1,1}}{4}} \, h_{1,1} s_{1,1} w_1 - \sqrt{\frac{P_{1,2}}{4}} \, h_{2,1} s_{1,2}^* w_1 + \sqrt{\frac{P_{1,2}}{4}} \, h_{1,1} s_{1,2} w_2 + \tag{38}$$
$$\sqrt{\frac{P_{1,1}}{4}} \, h_{2,1} s_{1,1}^* w_2 + \sum_{i=3}^{K} \sqrt{P_{i,1}} \, h_{1,1} s_{i,1} w_i + n_1(t)$$

while on frequencies $f_2$ and $f_3$ we receive:

$$r_2(t) = \sqrt{\frac{P_{1,2}}{4}} \, h_{1,2} s_{1,2} w_1 - \sqrt{\frac{P_{1,2}}{4}} \, h_{2,2} s_{1,3}^* w_1 + \sqrt{\frac{P_{1,3}}{4}} \, h_{1,2} s_{1,3} w_2 + \tag{39}$$
$$\sqrt{\frac{P_{1,2}}{4}} \, h_{2,2} s_{1,2}^* w_2 + \sum_{i=3}^{K} \sqrt{P_{i,2}} \, h_{2,2} s_{i,2} w_i + n_2(t)$$

and $$r_3(t) = \sqrt{\frac{P_{1,3}}{4}} \, h_{1,3} s_{1,3} w_1 + \sqrt{\frac{P_{1,1}}{4}} \, h_{2,3} s_{1,1}^* w_1 + \sqrt{\frac{P_{1,1}}{4}} \, h_{1,3} s_{1,1} w_2 - \tag{40}$$
$$\sqrt{\frac{P_{1,3}}{4}} \, h_{2,3} s_{1,3}^* w_2 + \sum_{i=3}^{K} \sqrt{P_{i,3}} \, h_{1,3} s_{i,2} w_i + n_3(t)$$

Now, at the output of the Walsh correlators A and B on frequency band j we obtain statistic $W_A^j$ and $W_B^j$:

$$W_A^1 = \sqrt{\frac{P_{1,1}}{4}} \, h_{1,1} s_{1,1} - \sqrt{\frac{P_{1,2}}{4}} \, h_{2,1} s_{1,2}^* + n_{1,1} \tag{41}$$

$$W_B^1 = \sqrt{\frac{P_{1,2}}{4}} \, h_{1,1} s_{1,2} + \sqrt{\frac{P_{1,1}}{4}} \, h_{2,1} s_{1,1}^* + n_{2,1}$$

$$W_A^2 = \sqrt{\frac{P_{1,2}}{4}} \, h_{1,2} s_{1,2} - \sqrt{\frac{P_{1,3}}{4}} \, h_{2,2} s_{1,3}^* + n_{1,2}$$

$$W_B^2 = \sqrt{\frac{P_{1,3}}{4}} \, h_{1,2} s_{1,3} + \sqrt{\frac{P_{1,2}}{4}} \, h_{2,2} s_{1,2}^* + n_{2,2}$$

$$W_A^3 = \sqrt{\frac{P_{1,3}}{4}} \, h_{1,3} s_{1,3} + \sqrt{\frac{P_{1,1}}{4}} \, h_{2,3} s_{1,1}^* + n_{1,3}$$

$$W_B^3 = \sqrt{\frac{P_{1,1}}{4}} \, h_{1,3} s_{1,1} - \sqrt{\frac{P_{1,3}}{4}} \, h_{2,3} s_{1,3}^* + n_{2,3}$$

We form the decision statistic for the data stream associated with the first mobile as:

$$Z_{1,1} = W_A^1 \hat{h}_{1,1}^* + (W_B^1)^* \hat{h}_{2,1} + W_B^{3*} \hat{h}_{1,3} + (W_A^3)^* \hat{h}_{2,3} \tag{42}$$

-continued $$= |h_{1,1}|^2 \sqrt{\frac{P_{1,1}}{4}} s_{1,1} - h_{1,1}^* h_{2,1} \sqrt{\frac{P_{1,2}}{4}} s_{1,2}^* + h_{1,1}^*$$

$$h_{2,1} s_{1,2}^* |h_{2,1}|^2 \sqrt{\frac{P_{1,1}}{4}} s_{1,1} + |h_{1,3}|^2 \sqrt{\frac{P_{1,1}}{4}} s_{1,1} -$$

$$h_{2,3}^* h_{1,3} \sqrt{\frac{P_{1,3}}{4}} s_{1,3}^* + h_{1,3}^* h_{2,3} \sqrt{\frac{P_{1,3}}{4}} s_{1,3}^* +$$

$$|h_{2,3}|^2 \sqrt{\frac{P_{1,1}}{4}} s_{1,1} + h_{1,1}^* n_{1,1} + h_{2,1} n_{1,2}^* + h_{1,3}^* n_{2,3} +$$

$$h_{2,3} n_{1,3}^*$$

$$= \left\{ \sqrt{\frac{P_{1,1}}{4}} |h_{1,1}|^2 + \sqrt{\frac{P_{1,1}}{4}} |h_{2,1}|^2 + \sqrt{\frac{P_{1,1}}{4}} |h_{1,3}|^2 + \right.$$

$$\left. \sqrt{\frac{P_{1,1}}{4}} |h_{2,3}|^2 \right\} s_{1,1} + h_{1,1}^* n_{1,1} + h_{2,1} n_{1,2}^* +$$

$$h_{1,3}^* n_{2,3} + h_{2,3} n_{1,3}^*$$

which has four-fold diversity when channel estimation is ideal, i.e., $\hat{h}_{i,j} = h_{i,j}$, and all frequency bands are independent. The decision statistics for $S_{1,2}$ and $S_{1,3}$ can be formed similarly. Thus, we can improve the performance of a particular user (mobile) significantly by assigning an extra Walsh code which will not cause cross-interference with other users regardless of channel estimation accuracy. This may be a feasible option for users that are not in soft hand-off, but are not close to the base station.

If sacrificing an additional Walsh code is not possible, we can still obtain diversity in a multi-carrier system. In the above formulation, we notice that each symbol is sent four times (thus four-fold diversity). If we do not wish to sacrifice the additional Walsh code we can create two Walsh codes with a repeat rate which is half the original as described in equation (30). Each data stream $s_i$ would then be split into two data streams $s_i^e$ and $s_i^o$ (even and odd). Instead of transmitting each signal four times, we transmit each signal twice. Thus, we now transmit according to the table shown in FIG. 8.

Combining in a manner similar to the multi-carrier embodiment described above (with the exception that only two Walsh outputs are used per decision statistic) we can obtain two-fold diversity when channel estimation is ideal.

Figure 9A:
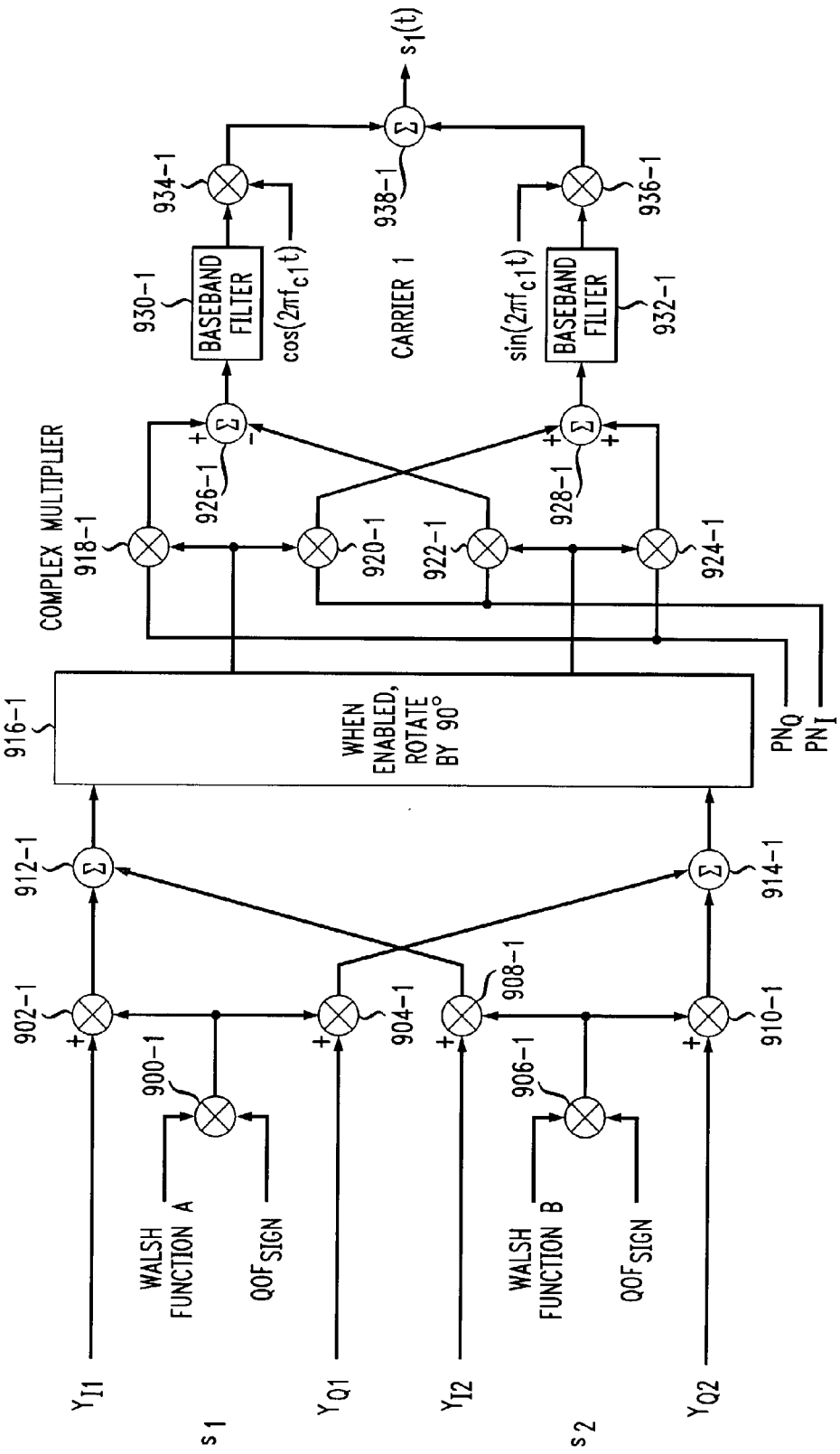
FIGS. 9A, 9B and 9C are block diagrams illustrating portions of a CDMA transmitter according to a first exemplary IS-95C direct spread embodiment of the invention.
Figure 9B:
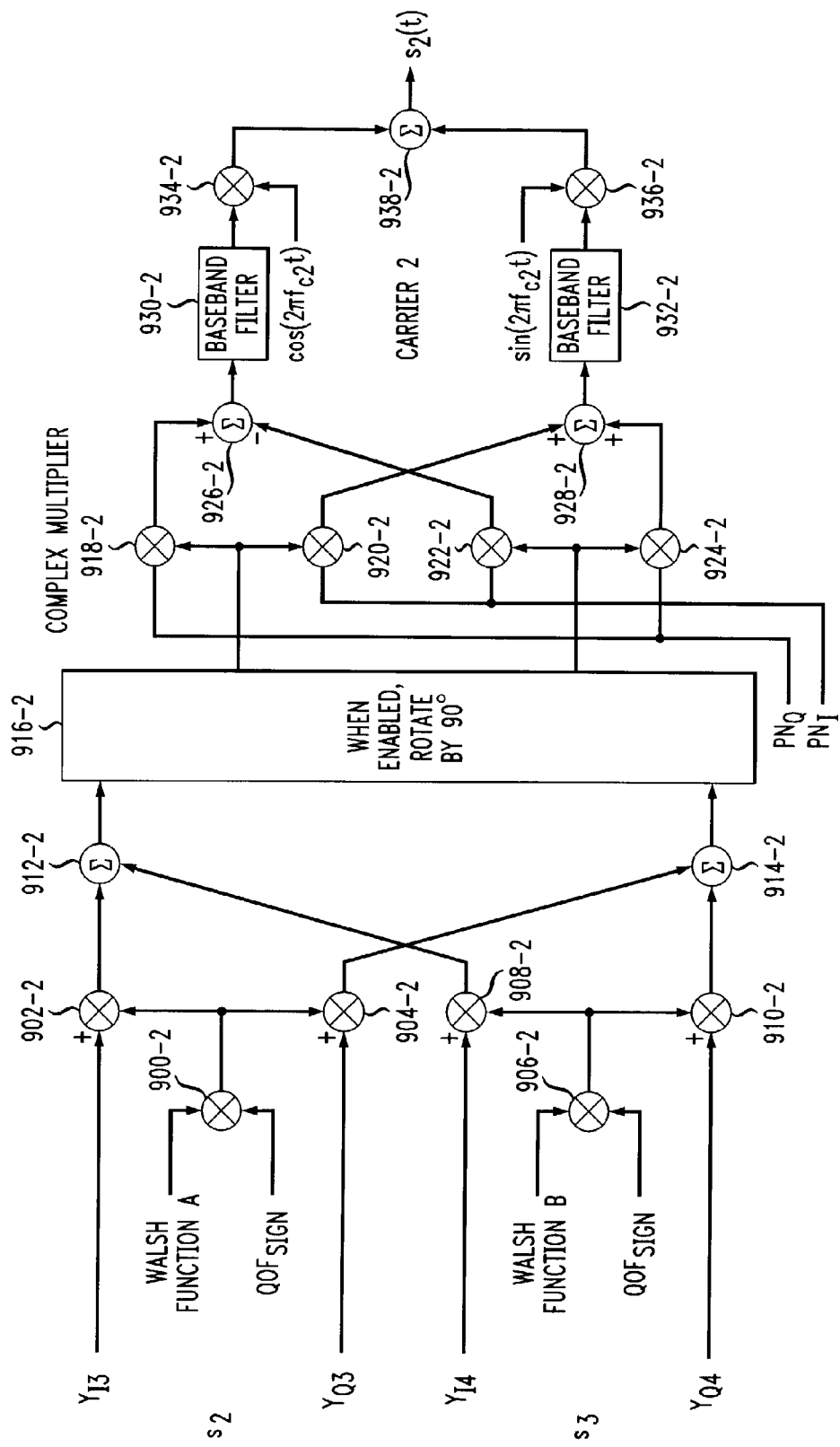
Figure 9C:
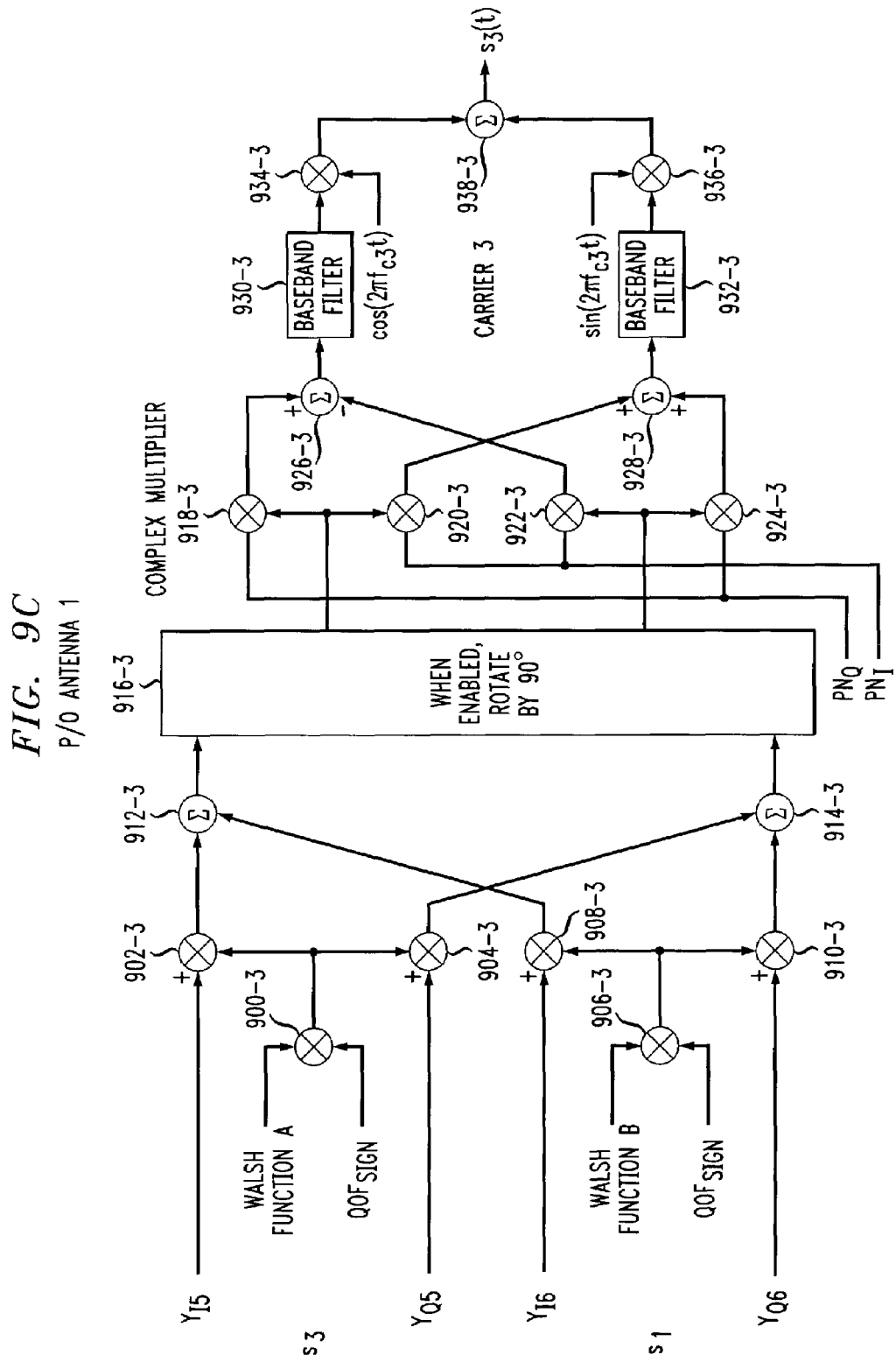
Figure 10A:
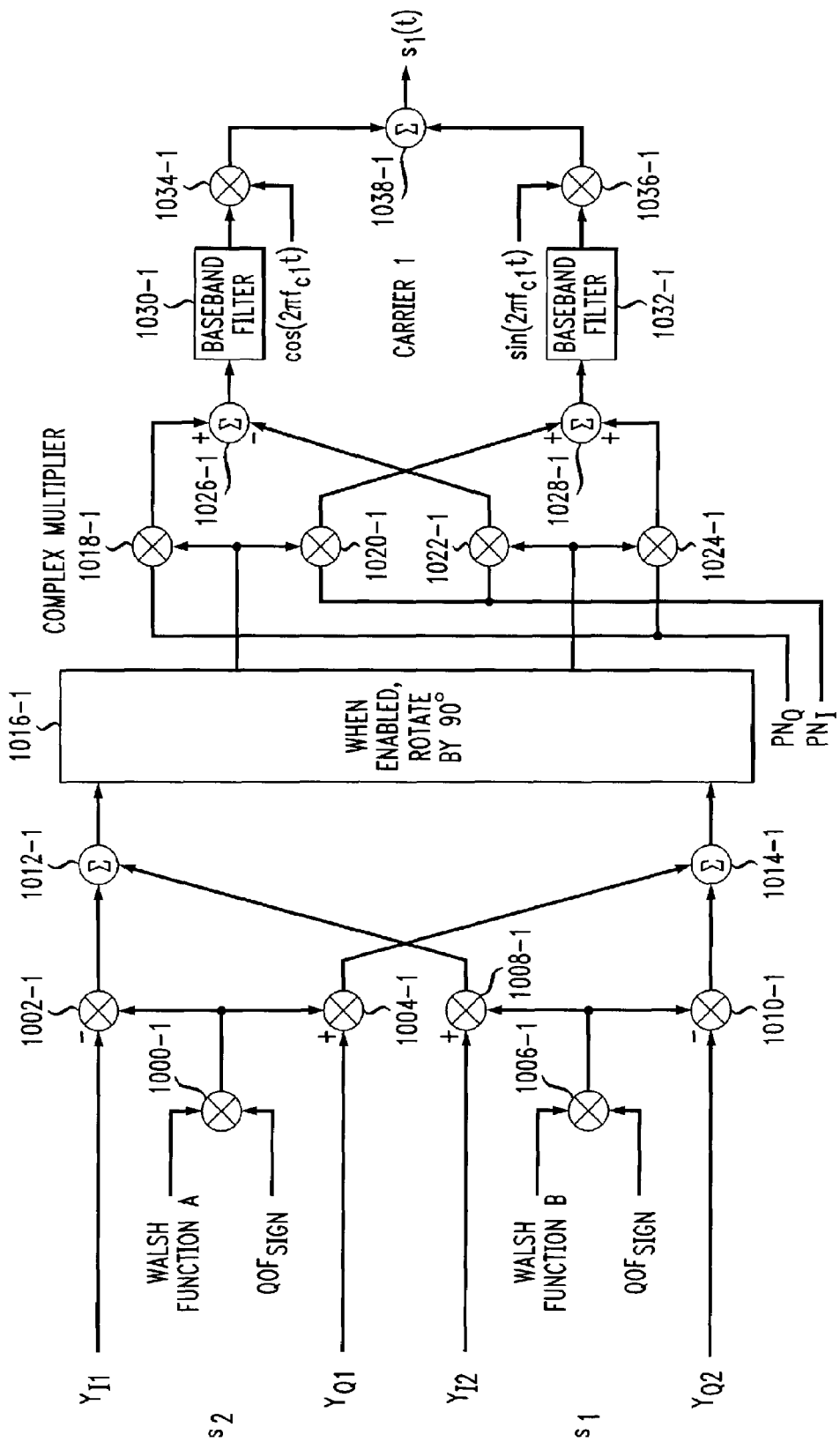
FIGS. 10A, 10B and 10C are block diagrams illustrating portions of a CDMA transmitter according to a second exemplary IS-95C direct spread embodiment of the invention.
Figure 10B:
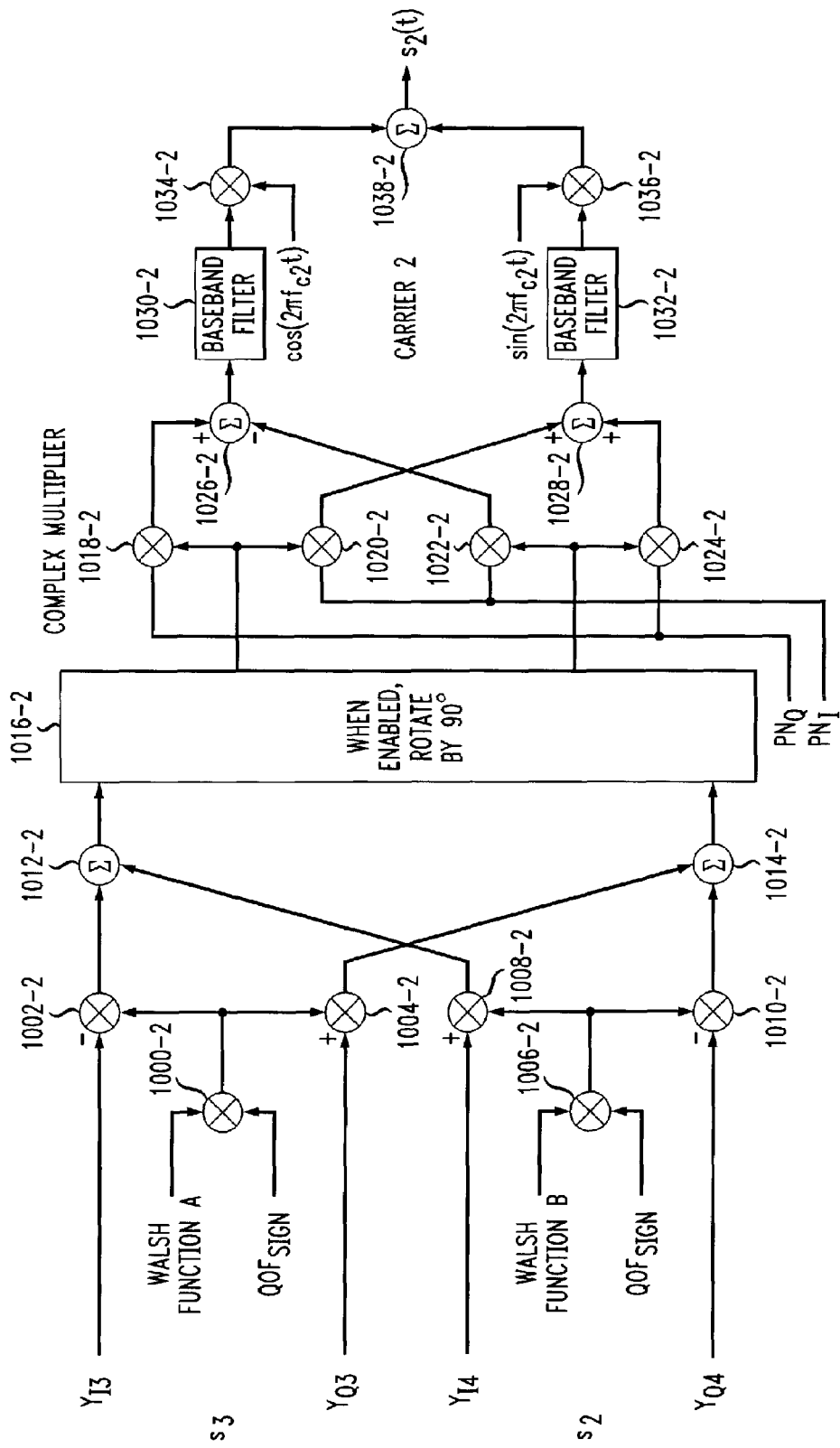
Figure 10C:
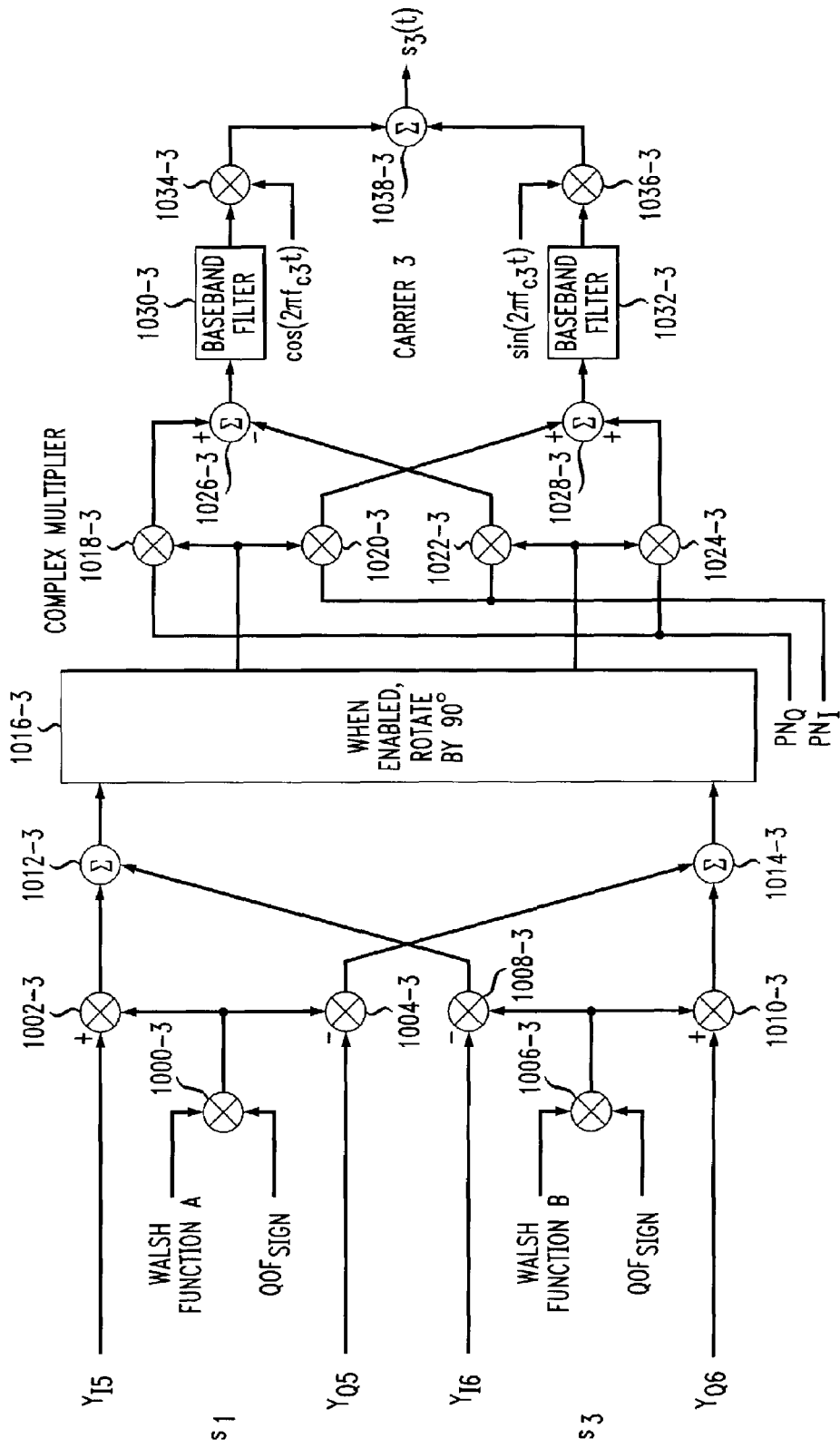

The changes required to the physical layer of the IS-95C transmitter to support Walsh diversity according to the invention for the multi-carrier format are shown in FIGS. 9A through 9C and 10A through 10C. This embodiment which we will call configuration A requires the use of two Walsh codes per user, termed Walsh codes A and B. FIGS. 9A through 9C depict the spreading and modulation operations for Walsh codes A and B for Antenna 1. FIGS. 10A through 10C depict the spreading and modulation operations for Walsh codes A and B for Antenna 2. For each antenna, the input sequence is split into three streams of data, $s_1$, $s_2$ and $s_3$, which are then mapped to respective I (in-phase) and Q (quadrature) channels as shown in FIGS. 9A through 9C and 10A through 10C. Each of the input streams is then partitioned or mapped to even and odd samples into respective I and Q channels. Thus for Antenna 1, FIG. 9A represents the mapped first stream including $Y_{I1}$, $Q_{I1}$, $Y_{I2}$, and $Y_{Q2}$, FIG. 9B represents the mapped second stream including $Y_{I3}$, $Q_{I3}$, $Y_{I4}$, and $Y_{Q4}$, and FIG. 9C represents the mapped third stream including $Y_{I5}$, $Q_{I5}$, $Y_{I6}$, and $Y_{Q6}$. It is to be appreciated that the same mapping is done with respect to the input sequence associated with Antenna 2.

The following will be a description of the processing of one of the mapped streams, particularly, the mapped first stream associated with Antenna 1 (FIG. 9A). It is to be appreciated that a similar process occurs with respect to the other mapped streams associated with Antenna 1. As such, the individual components in FIGS. 9A, 9B and 9C are respectively similar and thus denoted with the same reference numeral but with a dash number (-1, -2 and -3) following the reference numeral to specifically denote the mapped stream. The same is true for the mapped streams associated with Antenna 2 respectively shown in FIGS. 10A through 10C, however, the reference numerals in such figures have been incremented by 100 to distinguish between Antenna 1 and Antenna 2.

Thus referring to FIG. 9A by way of example, after mapping, the even and odd streams are spread. For the even stream, Walsh code A is multiplied by QOF in multiplier 900-1, the result of which is respectively multiplied by the I and Q portions of the even stream in multipliers 902-1 and 904-1. The same is done with respect to the odd stream using Walsh code B and multipliers 906-1, 908-1 and 910-1. Then, the I portions (outputs of multipliers 902-1 and 908-1) are combined in summer 192-1, while the Q portions (outputs of multipliers 904-1 and 910-1) are combined in summer 194-1. The outputs of the summers may be optionally rotated by 90 degrees in rotator 916-1, as defined by the IS-95C proposal (J. Losh article). The rotated signals are then respectively complex spread by the base station identifier sequence, $PN_I$ and $PN_Q$, in complex multipliers 918-1 through 924-1. The outputs of complex multipliers 918-1 and 922-1 are subtracted in summer 926-1, while the outputs of complex multipliers 920-1 and 924-1 are added in summer 928-1. The in-phase signal output by summer 926-1 is baseband filtered in filter 930-1 and then modulates the cosine component of the first of three carriers signals, $\cos(2\Pi f_{c1}t)$, in mixer 934-1. Similarly, the quadrature signal output by summer 928-1 is baseband filtered in filter 932-1 and then modulates the sine component of the same carrier signal, $\sin(2\Pi f_{c1}t)$, in mixer 936-1. The two modulated signals are then combined in summer 938-1 and transmitted by Antenna 1 as $s_1(t)$. As mentioned, $s_2(t)$ and $s_3(t)$ for Antenna 1 and $s_1(t)$, $s_2(t)$ and $s_3(t)$ for Antenna 2 are formed in a similar manner.

Figure 11B:
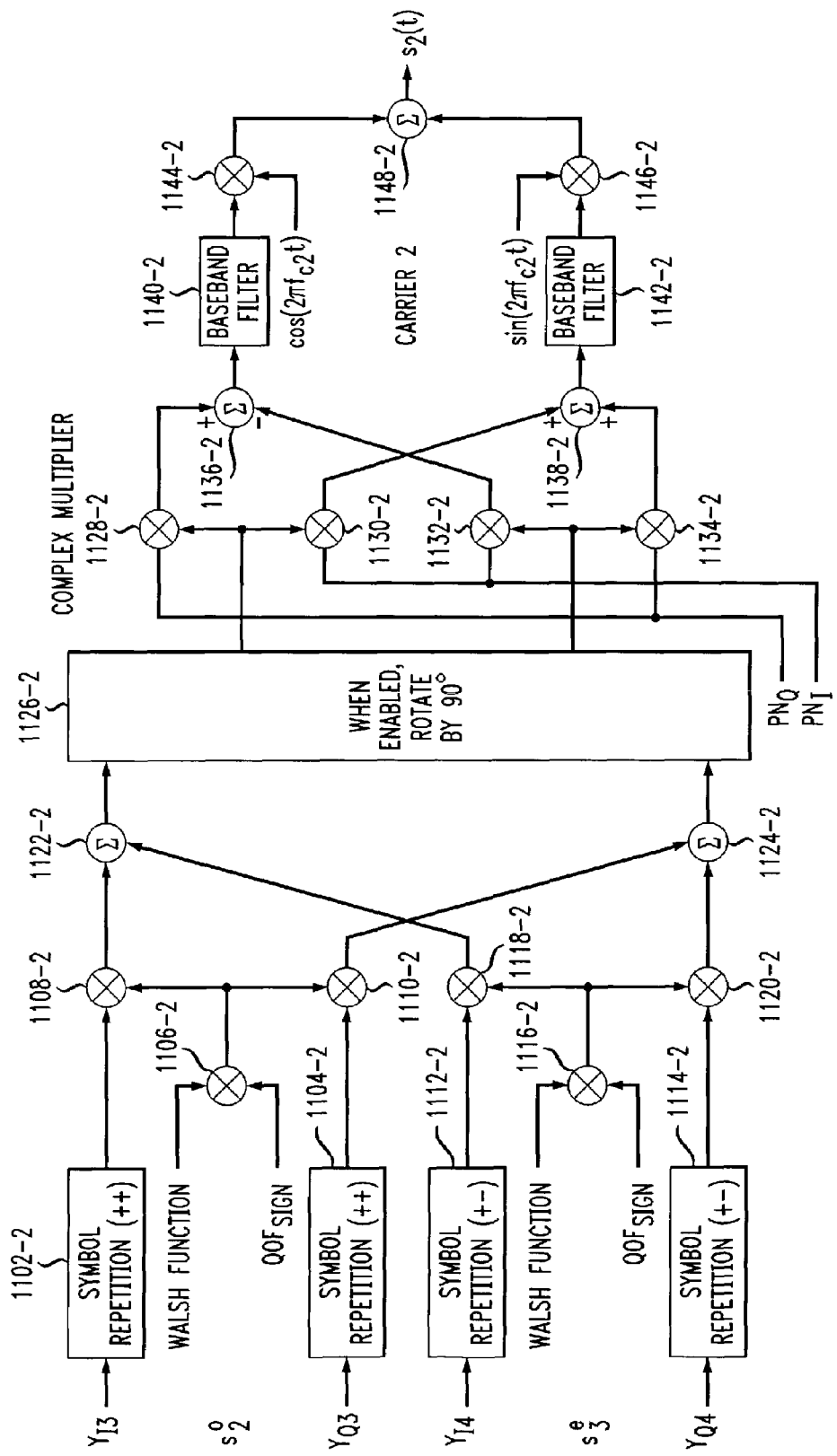
Figure 11C:
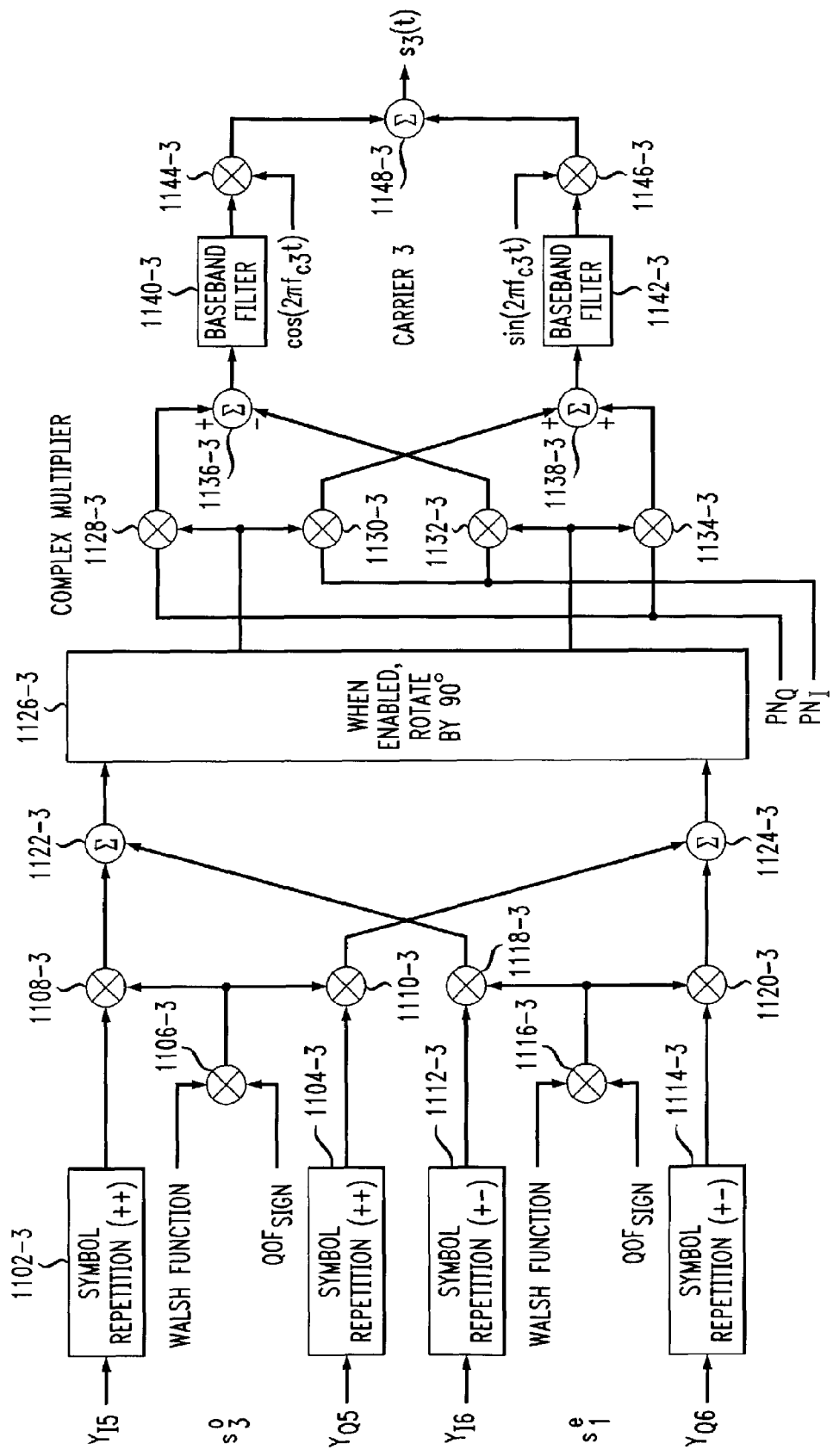
Figure 12A:
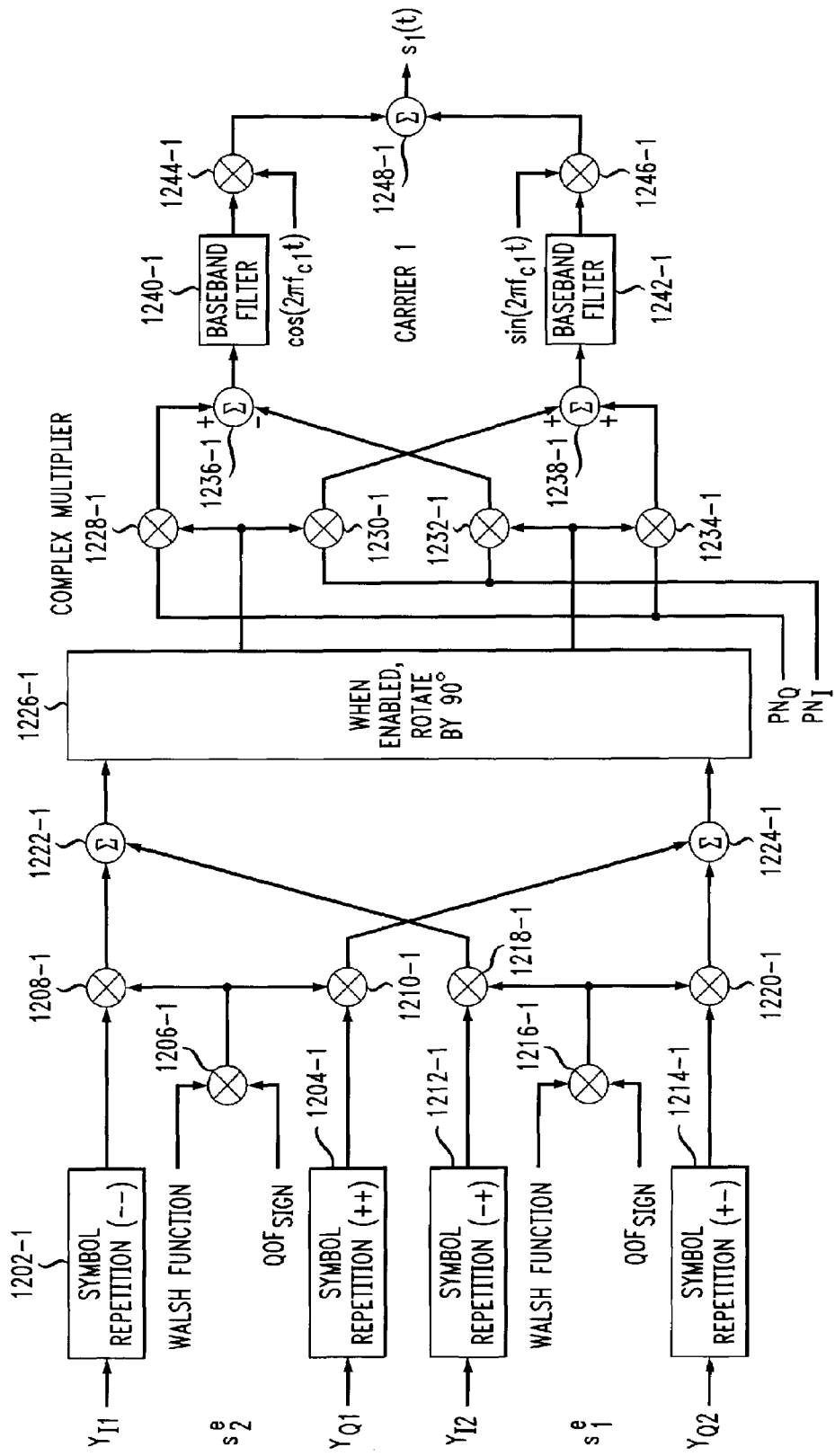
FIGS. 12A, 12B and 12C are block diagrams illustrating portions of a CDMA transmitter according to a second exemplary IS-95C multi-carrier embodiment of the invention.
Figure 12B:
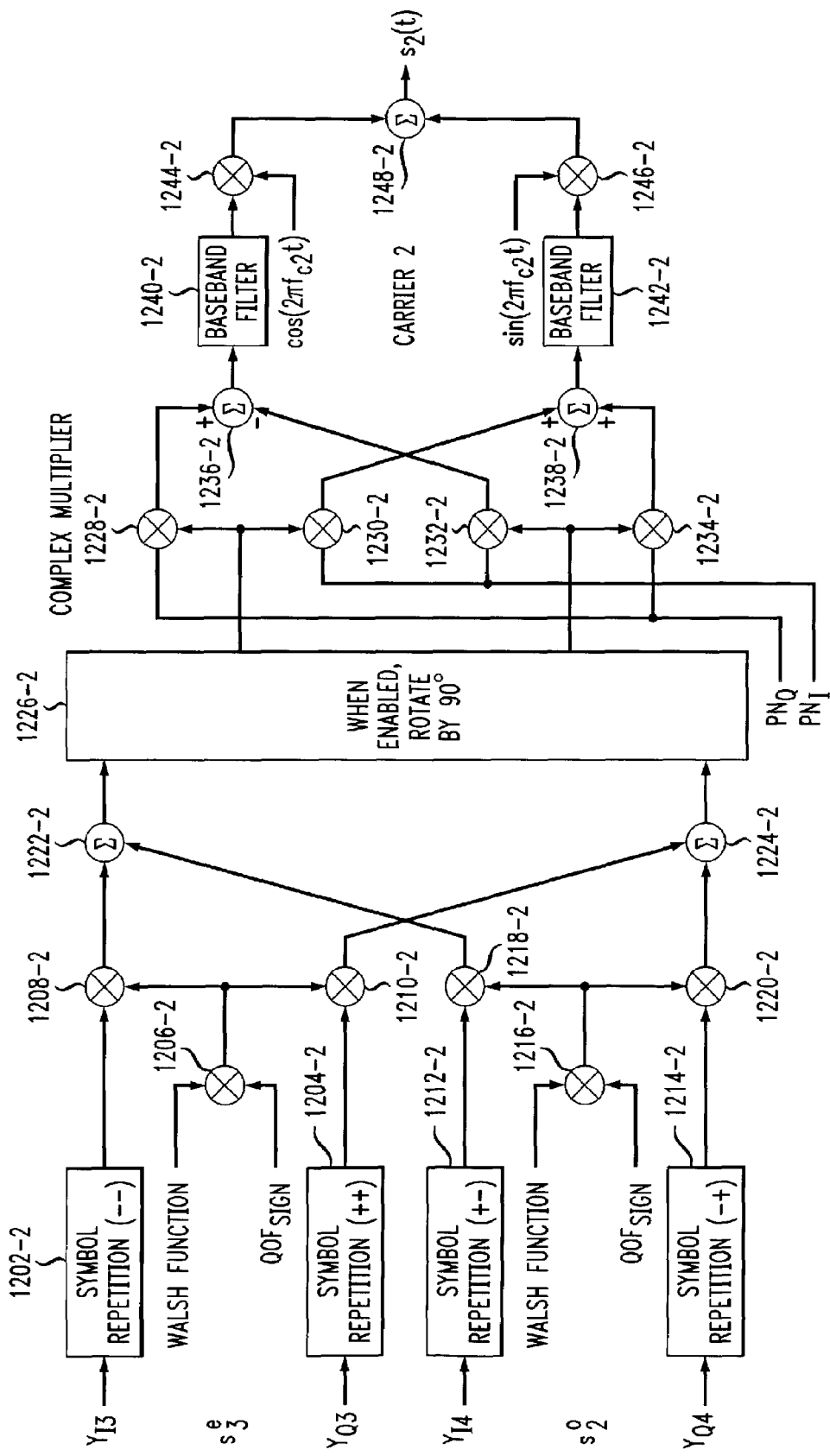
Figure 12C:
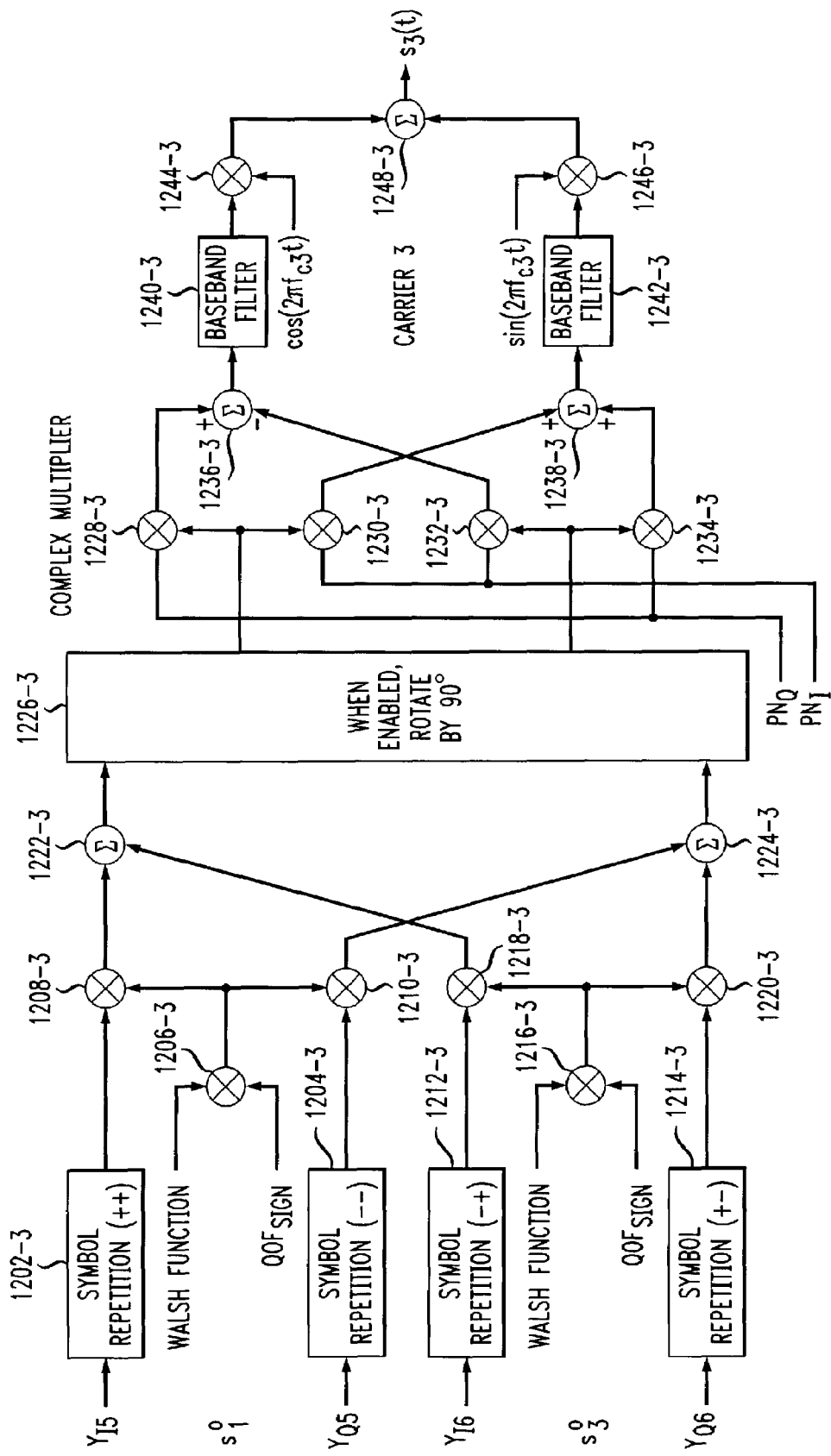

Referring now to FIGS. 11A through 11C and 12A through 12C, the changes in the physical layer of the IS-95C to support Walsh diversity according to the invention for the multi-carrier format are shown. This embodiment which we will call configuration B requires no additional Walsh codes but extends a single Walsh code similar to OTD mode. FIGS. 11A through 11C depict the spreading and modulation operations for Antenna 1, while FIGS. 12A through 12C depict the spreading and modulation operations for Antenna 2. Again, for each antenna, the input sequence is split into three streams of data, $s_1$, $s_2$ and $s_3$. These streams are then split into even and odd streams $s_i^e$ and $s_i^o$. It is to be appreciated that the data streams $s_1$, $s_2$ and $s_3$ are mapped to respective I and Q channels in accordance with the table shown in FIG. 8. Each of the input streams is then partitioned or mapped to even and odd samples into respective I (in-phase) and Q (quadrature) channels as in configuration A.

The following will be a description of the processing of one of the mapped streams, particularly, the mapped first stream associated with Antenna 1 (FIG. 11A). It is to be appreciated that a similar process occurs with respect to the other mapped streams associated with Antenna 1. As such, the individual components in FIGS. 11A, 11B and 11C are respectively similar and thus denoted with the same reference numeral but with a dash number (-1, -2 and -3) following the reference numeral to specifically denote the mapped stream. The same is true for the mapped streams associated with Antenna 2 respectively shown in FIGS. 12A through 12C, however, the reference numerals in such figures have been incremented by 100 to distinguish between Antenna 1 and Antenna 2.

Thus referring to FIG. 11A by way of example, after mapping, the I and Q portions of the even stream are respectively held in symbol repetition units 1102-1 and 1104-1 for two symbol intervals and multiplied by the signs indicated in the boxes. This operation accomplishes the conjugation operation and multiplying by the respective signs needed. The data is then spread by the Walsh function and the QOF. This is accomplished by multiplying the Walsh function and QOF in multiplier 1106-1 and then multiplying the result with the output of each symbol repetition unit 1102-1 and 1104-1 in multipliers 1108-1 and 1110-1. The same process is performed on the I and Q portions of the odd stream using symbol repetition units 1112-1 and 114-1 and multipliers 1116-1, 118- and 1120-1. Then, the I portions (outputs of multipliers 1108-1 and 1110-1) are combined in summer 1122-1, while the Q portions (outputs of multipliers 1118-1 and 1120-1) are combined in summer 1124-1. The outputs of the summers may be optionally rotated by 90 degrees in rotator 1126-1, as defined by the IS-95C proposal (J. Losh article). The rotated signals are then respectively complex spread by the base station identifier sequence, $PN_I$ and $PN_Q$, in complex multipliers 1128-1 through 1134-1. The outputs of complex multipliers 1128-1 and 1132-1 are subtracted in summer 1136-1, while the outputs of complex multipliers 1130-1 and 1134-1 are added in summer 1138-1. The in-phase signal output by summer 1136-1 is baseband filtered in filter 1140-1 and then modulates the cosine component of the first of three carriers signals, $\cos(2\Pi f_{c1} t)$, in mixer 1144-1. Similarly, the quadrature signal output by summer 1138-1 is baseband filtered in filter 1142-1 and then modulates the sine component of the same carrier signal, $\sin(2\Pi f_{c1} t)$, in mixer 1146-1. The two modulated signals are then combined in summer 1148-1 and transmitted by Antenna 1 as $s_1(t)$. As mentioned, $s_2(t)$ and $s_3(t)$ for Antenna 1 and $s_1(t)$, $s_2(t)$ and $s_3(t)$ for Antenna 2 are formed in a similar manner.

Figure 13:
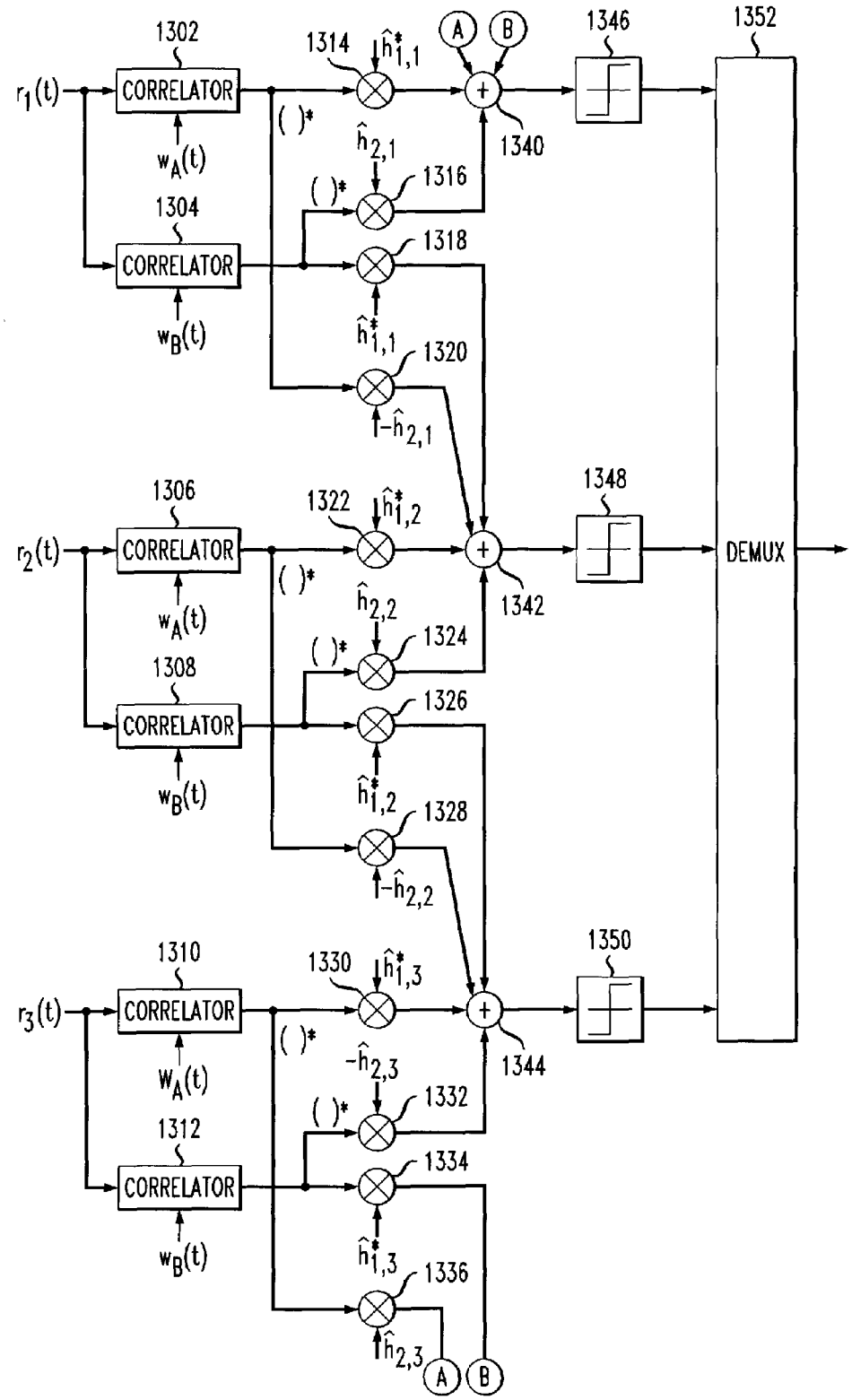
FIG. 13 is a block diagram illustrating a portion of a CDMA receiver according to a first exemplary IS-95C multi-carrier embodiment of the invention.

Referring now to FIG. 13, a receiver structure for the configuration A multi-carrier embodiment is shown. As mentioned, this embodiment uses two Walsh codes per user to allow four-fold diversity. The down-converted signals from carriers 1, 2, and 3, after uncovering, are represented as $r_1(t)$, $r_2(t)$ and $r_3(t)$, respectively. Each received signal is then correlated with both spreading codes $w_A(t)$ and $w_B(t)$ associated with the user signal of interest. This is accomplished in correlators 1302 through 1312. Each correlator output is then multiplied by one of six channel estimates $\hat{h}_{n,m}$ where n signifies the transmit antenna and m signifies the frequency band. This is accomplished in multipliers 1314 through 1336. Since there are two transmit antennas and three frequency bands, there are a total of six required channel estimates. Note that some correlators are conjugated prior to this multiplication. This operation is represented by (•)*. Similarly, some channel estimates must also be conjugated prior to multiplication. The twelve resulting products are then combined to create three symbol statistics, with each product being used only once. This is accomplished using adders 1340 through 1344. The three resulting symbol statistics are then respectively sent to decision units 1346 through 1350 which create bit metrics for a Viterbi decoder. These bit metrics are then demultiplexed in demultiplexer 1352 and sent to a soft decision Viterbi decoder (not shown). Note that since each symbol statistic is created from four ideally independent fading channel outputs, the resulting symbol decision will achieve four-fold diversity.

Figure 14:
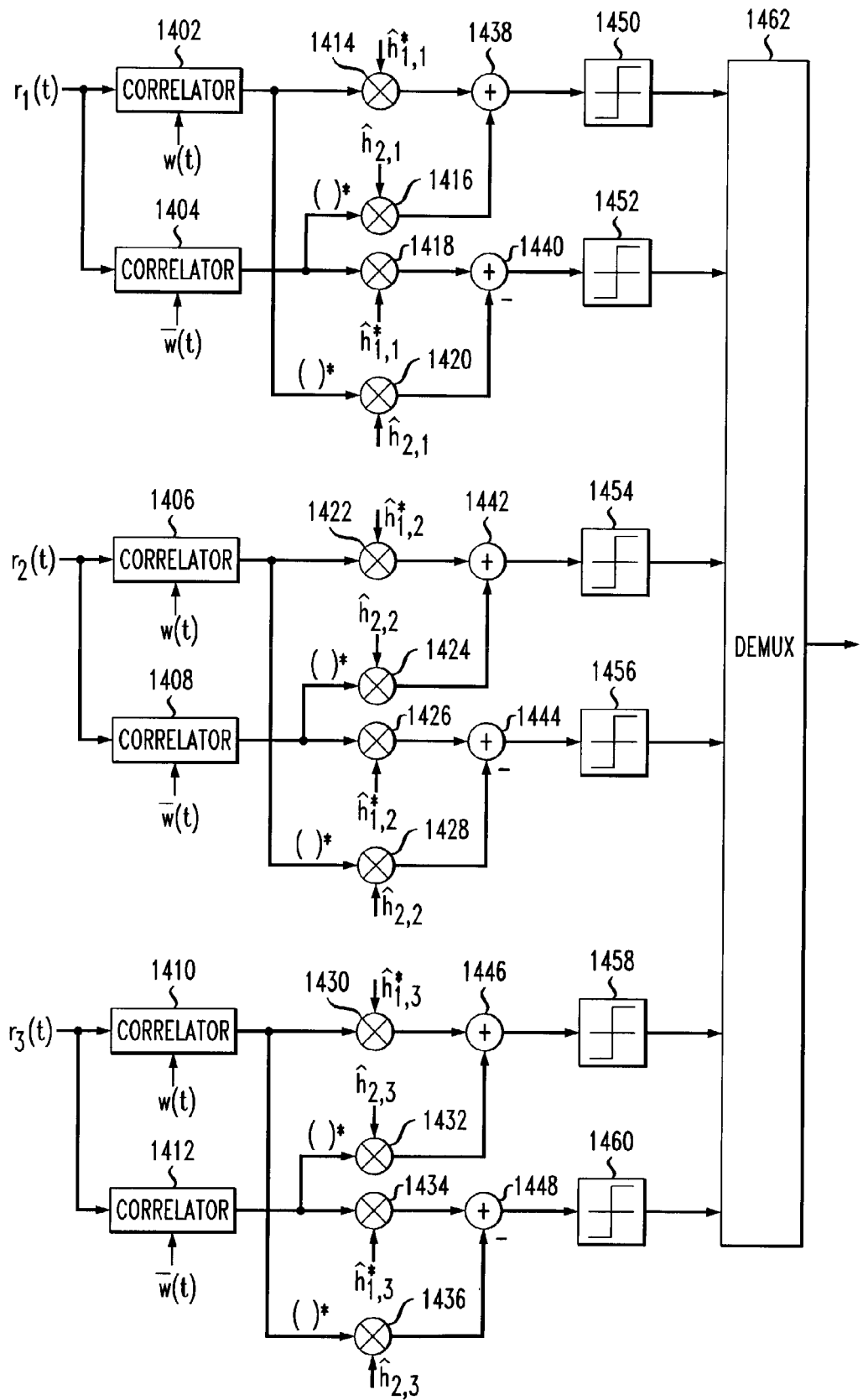
FIG. 14 is a block diagram illustrating a portion of a CDMA receiver according to a second exemplary IS-95C multi-carrier embodiment of the invention.

Referring now to FIG. 14, a receiver structure for the configuration B multi-carrier embodiment is shown. As mentioned, this embodiment uses a single Walsh code per user but extends the code as in OTD mode and achieves two-fold diversity. The receiver operation is similar to that described for configuration A with the exception that the two spreading codes are the extended original Walsh code w (t) and its complement code $\overline{w}(t)$. Thus correlators 1402 through 1412 are used to correlate the down-converted and uncovered received signals with the Walsh codes. Additionally, now six symbol metrics are formed by adding together two channel compensated correlator outputs rather than four as in configuration A. This is accomplished by multipliers 1414 through 1436 and adders 1438 through 1448. Again, the six statistics are respectively sent to decision units 1450 through 1460 which map the complex symbol statistics to bit metrics. The bit metrics are then demultiplexed by demultiplexer 1462 and sent to a Viterbi decoder (not shown).

In order to generalize the multi-carrier approach described above for configurations A and B and for M antennas and F frequency bands, the following variables are defined: F represents frequency bands; M represents base station transmit antennas; W represents Walsh codes per user; $W_{tot}$ represents total available Walsh codes; D represents data streams per user; and B represents the frequency bands used per antenna. Thus, with this nomenclature, it is to be appreciated that there are F•M independent physical channels, F•W orthogonal channels, F•W•M transmission channels and D data streams, each of which occupies one Walsh code per frequency band. Thus, according to this approach F•M-fold diversity can be achieved. Let x be the number of channels over which a base station sends K•D data streams such that: $1 \leq K \cdot x \leq F \cdot W_{tot} \cdot M \cdot B$. It is to be appreciated that x=F•W•M•B. Thus, for $$1 \leq \frac{x}{D} \leq F \cdot M, \frac{x}{D}$$

fold diversity can be achieved. For $$\frac{x}{D} \geq F \cdot M,$$

F•M-fold diversity can be achieved. Further, it is to be noted that channel efficiency η is defined as $$\frac{D}{F \cdot M}.$$

Thus, as $$\frac{x}{D}$$

increases, channel efficiency decreases and diversity increases, provided that streams are assigned to independent channels. Independent channels are defined as channels on different frequency bands and/or antennas.

Further, it is required that the number of Walsh codes be $2^n$ for some integer n for proper decoding. That is, if ν equals desired diversity, then $$\frac{D \cdot K \cdot v}{F} = 2^n.$$

Thus, the transmission matrix T must have $F \cdot 2^n$ rows. As a result, although we increase channel utilization, we can achieve increased diversity which improves performance of existing channels. For maximum diversity we assign M Walsh codes per data stream ($F \cdot M$-fold diversity). If $$\frac{D \cdot v}{F} = 2^n$$

for any integer n, no sharing of Walsh codes is necessary. Additionally, channel efficiency is $$\frac{D}{F \cdot W}$$

which is equal to $$\frac{1}{F \cdot M}.$$

Thus, the transmission matrix T has $F \cdot W$ rows and M columns. Again, the columns are designed to be orthogonal.

The following is an example illustrating channel efficiency and diversity results associated with the existing IS-95C approach and the approaches of the invention embodied in configurations A and B:

EXAMPLE 1

Existing IS-95C Approach

Given W=1, M=2, F=3, D=3, B=½

$$\frac{x}{D} = \frac{3 \cdot 1 \cdot 2 \cdot \frac{1}{2}}{3} = 1$$

or one-fold diversity, which is equivalent to no diversity $$\eta = \frac{3}{3} = 1.$$

EXAMPLE 2

Configuration A of the Invention

Given W=2, M=2, F=3, D=3, B=1

$$T = \begin{bmatrix} s_1 & -s_2^* \\ s_2 & -s_3^* \\ s_3 & s_1^* \\ s_2 & s_1^* \\ s_3 & s_2^* \\ s_1 & -s_3^* \end{bmatrix}$$

$$\frac{x}{D} = \frac{3 \cdot 2 \cdot 2 \cdot 1}{3} = 4 \text{ or four-fold diversity}$$

$$\eta = \frac{3}{3 \cdot 2} = \frac{1}{2}.$$

EXAMPLE 3

Configuration B of the Invention

Given W=1, M=2, F=3, D=3, B=1

$$T = \begin{bmatrix} s_1^e & -s_2^{e*} \\ s_2^o & -s_3^{e*} \\ s_3^o & s_1^{o*} \\ s_2^e & s_1^{e*} \\ s_3^e & s_2^{o*} \\ s_1^o & -s_3^{o*} \end{bmatrix}$$

$$\frac{x}{D} = \frac{3 \cdot 1 \cdot 2 \cdot 1}{3} = 2 \text{ or two-fold diversity}$$

$$\eta = \frac{3}{3 \cdot 1} = 1.$$

Thus, as illustrated above, the existing IS-95C approach provides no diversity while configuration A and B of the invention provide four and two-fold diversity. Also, configuration B exhibits no loss in channel efficiency.

It is to be appreciated that the methodologies of the present invention, as described herein, may be implemented in the mobiles and base stations by individual hardware components such as functional circuitry (e.g., multipliers, filters, adders, etc.) and/or by one or more processors respectively associated therewith. The term "processor" is intended to include any processing device, including a CPU (central processing unit), or microprocessor, and associated memory. The term "memory" as used herein is intended to include memory associated with a processor or CPU, such as RAM, ROM, a fixed mass storage memory device, or a removable memory device. Accordingly, software instructions or code associated with implementing the methodologies of the present invention may be stored in associated memory and, when ready to be utilized, retrieved and executed by an appropriate CPU. Also, the term "mobile" may generally refer to any device capable of communications with a base station. That is, while the term mobile is used herein, it may include user terminals or stations that are fixed, as well as user terminals or stations that actually are able to move.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a base station in a CDMA system which includes K mobiles associated with the base station for providing improved downlink diversity, the method comprising the steps of:

modulating Walsh codes with data signals respectively associated with at least a portion of the K mobiles to generate transmit signals for respective transmission on M transmit antennas associated with the base station, wherein M is greater than or equal to two, the data signals respectively associated with given mobiles modulate different Walsh codes in generating each transmit signal such that each transmit signal generated comprises a linear combination of respective results of the modulation of each of the different Walsh codes by each of the data signals for the K mobiles, when such a data signal is available for a given mobile; and transmitting the respective transmit signals on the M antennas for receipt by at least a portion of the K mobiles, wherein the transmit signals are correlated using M Walsh codes.

2. The method of claim 1, wherein mapping of the data signals onto the Walsh codes for each antenna is determined according to a transmission matrix.

3. A method for use in a mobile in a CDMA system which includes K mobiles and a base station associated therewith for providing improved downlink diversity, the method comprising the steps of:

receiving M transmit signals respectively transmitted on M transmit antennas associated with the base station and generated at the base station by modulating Walsh codes with data signals respectively associated with at least a portion of the K mobiles, wherein M is greater than or equal to two, the data signals respectively associated with given mobiles modulate different Walsh codes in generating each transmit signal such that each transmit signal generated comprises a linear combination of respective results of the modulation of each of the different Walsh codes by each of the data signals for the K mobiles, when such a data signal is available for a given mobile; and correlating the M transmit signals using M Walsh codes.

4. The method of claim 3, wherein mapping of the data signals onto the Walsh codes for each antenna is determined according to a transmission matrix.

5. Apparatus for use in a CDMA system for providing improved downlink diversity, the apparatus comprising:

a base station which includes M transmit antennas and is associated with K mobiles and is configured for modulating Walsh codes with data signals respectively associated with at least a portion of the K mobiles in the CDMA system to generate transmit signals for respective transmission on the M transmit antennas, wherein M is greater than or equal to two, the data signals respectively associated with given mobiles modulate different Walsh codes in generating each transmit signal such that each transmit signal generated comprises a linear combination of respective results of the modulation of each of the different Walsh codes by each of the data signals for the K mobiles, when such a data signal is available for a given mobile, the base station is also configured for transmitting the respective transmit signals on the M antennas for receipt by at least a portion of the K mobiles, wherein the transmit signals are correlated using M Walsh codes.

6. The apparatus of claim 5, wherein mapping of the data signals onto the Walsh codes for each antenna is determined according to a transmission matrix.

7. Apparatus for use in a mobile in a CDMA system for providing improved downlink diversity, the apparatus comprising:

a mobile which is associated with a base station having K mobiles associated therewith, the mobile is configured for receiving M transmit signals respectively transmitted on M transmit antennas associated with the base station and generated at the base station by modulating Walsh codes with data signals respectively associated with at least a portion of the K mobiles, wherein M is greater than or equal to two, the data signals respectively associated with given mobiles modulate different Walsh codes in generating each transmit signal such that each transmit signal generated comprises a linear combination of respective results of the modulation of each of the different Walsh codes by each of the data signals for the K mobiles, when such a data signal is available for a given mobile, the mobile is also configured for correlating the M transmit signals using M Walsh codes.

8. The apparatus of claim 7, wherein mapping of the data signals onto the Walsh codes for each antenna is determined according to a transmission matrix.

* * * * *